United States Patent
Wood et al.

(10) Patent No.: US 6,396,975 B1
(45) Date of Patent: May 28, 2002

(54) MEMS OPTICAL CROSS-CONNECT SWITCH

(75) Inventors: Robert L. Wood, Cary; Edward A. Hill; Ramaswamy Mahadevan, both of Chapel Hill, all of NC (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/489,264

(22) Filed: Jan. 21, 2000

(51) Int. Cl.[7] .................................................. G02B 6/26
(52) U.S. Cl. ............................................ 385/18; 385/16
(58) Field of Search ........................ 385/16, 17, 18–24, 385/6, 33; 359/223, 196, 117

(56) References Cited

U.S. PATENT DOCUMENTS

| | | | | |
|---|---|---|---|---|
| 5,960,132 A | * | 9/1999 | Lin .............................. | 385/18 |
| 6,256,430 B1 | * | 7/2001 | Jin et al. ...................... | 385/18 |

OTHER PUBLICATIONS

Cowen et al., Modeling of Stress–Induced Curvature in Surface–Micromachined Devices, Microlithography and Metrology in Micromachining III, SPIE Proceedings, vol. 3225, Paper No. 3225–06, pp. 56–67.

Yi et al., Magnetic Actuation of Hinged Microstructures, IEEE Journal of Microelectromechanical Systems, vol. 8, No. 1, Mar. 1999, pp. 10–17.

Behin et al., Magnetically Actuated Micromirrors for Fiber–Optic Switching, Solid–State Sensor and Actuator Workshop, Hilton Head Island, South Carolina, Jun. 8–11, 1998, pp. 273–276.

Yi et al., Parallel Assembly of Hinged Microstructures Using Magnetic Actuation, Solid–State Sensor and Actuator Workshop, Hilton Head Island, South Carolina, Jun. 8–11, 1998, pp. 269–272.

Judy, Magnetically Actuated, Addressable Microstructures, Journal of Microelectromechanical Systems, vol. 6, No. 3, Sep. 1997, pp. 249–255.

Marxer et al., Vertical Mirrors Fabricated by Reactive Ion Etching for Fiber Optical Switching Applications, Tenth IEEE International MEMS Workshop, 1997, pp. 349–354.

Judy, Magnetic Microactuation of Torsional Polysilicon Structures, Sensors and Actuators A, vol. 53, 1996, pp. 392–397.

Toshiyoshi et al., Optical Crossconnection By Silicon Micromachined Torsion Mirrors, Advanced Applications of Lasers in Materials Processing/Broadband Optical Networks/Smart Pixels/Optical MEMs and Their Applications. IEEE/LEOS 1996 Summer Topical Meetings:, 1996, pp. 63–64.

Smith, *Modern Optical Engineering*, McGraw–Hill, 1996, pp. 176.

Field et al., Micromachined 1X2 Optical Fiber Switch, Solid–State Sensors and Actuators, 1995 and Eurosensors IX.. Transducers '95. The 8th International Conference on, vol.: 1, pp. 344–347.

* cited by examiner

*Primary Examiner*—Phan T. H. Palmer
(74) *Attorney, Agent, or Firm*—Myers Bigel Sibley & Sajovec

(57) ABSTRACT

A microelectromechanical structure capable of switching optical signals from an input fiber to one of two or more output fibers. In one embodiment, the MEMS optical cross-connect switch comprises a first microelectronic substrate having a pop-up mirror disposed on the surface of the substrate and a rotational magnetic field source, such as a variably controlled magnetic field source. The rotational magnetic field source allows for reliable actuation of the pop-up mirror from a non-reflective state to a reflective state. Additionally the invention is embodied in a MEMS optical cross-connect switch having a first microelectronic substrate having a pop-up mirror disposed on the surface of the substrate and a positioning structure disposed in a fixed positional relationship relative to the first substrate. The positioning structure may comprise a positioning structure extending from a second microelectronic substrate that is in a fixed positional relationship relative to the first microelectronic substrate. The positioning structure serves to restrict further movement of the pop-up mirror when the pop-up mirror has been actuated into a reflective state.

99 Claims, 11 Drawing Sheets

MEMS OPTICAL CROSS-CONNECT SWITCH

FIELD OF THE INVENTION

The present invention relates generally to optical switches and associated fabrication methods and, more particularly, to microelectromechanical single mode optical fiber cross-connect switch and associated fabrication methods.

BACKGROUND OF THE INVENTION

Advances in thin film technology have enabled the development of sophisticated integrated circuits. This advanced semiconductor technology has also been leveraged to create MEMS (Micro Electro Mechanical System) structures. MEMS structures are typically capable of motion or applying force. Many different varieties of MEMS devices have been created, including microsensors, microgears, micromotors, and other microengineered devices. MEMS devices are being developed for a wide variety of applications because they provide the advantages of low cost, high reliability and extremely small size. In this capacity MEMS technology has been applied to the development of a free-space switch for single mode optical fibers.

Optical fiber offers many advantages compared with electric cables, including high bandwidth, low loss, lightweight, immunity from current surges and negligible electromagnetic interference. The use of extensive fiber optic networks are gaining wide acceptance and are being supported by the telecommunications industry as one of the international standards for high-speed local area networks (LANs). Fiber optic switches are used in the networks to reconfigure the network and/or increase overall reliability. For example, optical bypass switches have been employed to bypass failed nodes within the network.

The fiber optic switches can be fabricated using either a free-space approach or a waveguide approach. The free-space approach offers a number of advantages over the conventional waveguide approach. For an example of a conventional waveguide approach see the technical publication by L. A. Field et al., entitled "Micromachined 1×2 Optical-Fiber Switch" International Solid-State Sensors and Actuators Conference—Transducers 1995, Stockholm, Sweden Jun. 25–29, 1995. The free space approach has lower coupling loss and minimal cross talk. However, conventional free-space fiber optic switches employ bulk optical elements and are typically very costly to manufacture. MEMS technology allows for improved performance of free space fiber optic switches and can be manufactured at relatively minimal cost. For examples of such free space MEMS switches see the technical publications by H. Toshiyoshi et al., entitled "Optical Crossconnection by Silicon Micromachined Torsion Mirrors", Digest IEEE/LEOS 1996 Summer Topical Meetings, pp. 63–64, Keystone, CO, Aug. 5–9, 1996 and C. Marser et al., entitled "Vertical Mirrors Fabricated by Reactive Ion Etching for fiber Optical Switching Applications", Tenth IEEE International MEMS Workshop, pp. 349–354, 1997.

In the most rudimentary form, the MEMS fiber optical switch is capable of routing input from a single fiber to one of two possible output fibers. The fiber-based telecommunications industry desires a microelectronic switch architecture that will permit the integration of multiple switch elements into an array. A critical aspect of the array design is the ability to create a non-blocking, one-to-one operable switch array, such that, setting one switch element to route one input fiber will not interfere with the setting of other switch elements intended to route other input fibers. Of additional importance is the desire to create an array architecture that is scaleable, allowing. for numerous input fibers to be routed to output fibers as dictated by the application. The fiber optical switch must be designed to limit insertion loss by providing for a stationary reflective state that allows for optical fibers to be redirected in a reliable fashion.

Another concern of current microelectronic optical switches is the ability to properly actuate the reflective structure, or mirror, from a non-reflective state to a reflective state. The use of magnetic fields to actuate the mirrors has provided marginal success. In most instances, a constant magnetic field is used that provides maximum torque to the mirror at the midway point between the non-reflective and reflective state. Once the torque peaks at the midway point it gradually decreases until it approaches low torque as the mirror reaches the reflective state. The low torque effect impedes the mirror from consistently attaining the requisite reflective state.

Therefore, while some free space optical fiber cross-connect switches have been developed, it would still be advantageous to develop other types of optical cross-connect switches that would operate more reliably in terms of minimizing insertion loss, allow for a non-blocking, one-to-one operable switch matrix, provide for a scaleable array of switches, allow for consistent actuation and lend themselves to cost-effective manufacturing. Consequently, these MEMS optical cross-connect switches would be suitable for a wider variety of telecommunications applications. Numerous telecommunications applications, such as fiber optic networks, would benefit from MEMS optical cross-connect switches having these improved attributes.

SUMMARY OF THE INVENTION

The present invention provides for a microelectromechanical structure capable of switching optical fibers from an input fiber to one of two or more output fibers. In one embodiment, the MEMS optical cross-connect switch comprises a first microelectronic substrate having a pop-up mirror disposed on the surface of the substrate and a rotational magnetic field source disposed proximate the first substrate that provides the actuation force to the pop-up mirror. The rotational magnetic field may comprise a variably controlled magnetic field capable of maximizing torque throughout the actuation period. The variably controlled magnetic field may comprise a pair of wire coils having generally orthogonal magnetic field axis. The variably controlled magnetic field source can be adjusted during actuation by varying the current supplied to the coil(s) thereby maximizing the magnetic torque and generating optimal actuation force throughout the movement of the pop-up mirror from the non-reflective to reflective state, Additionally, a magnetic pole piece may be positioned proximate the second microelectronic substrate to provide further magnetic attraction to the pop-up mirror.

Additionally, this embodiment may comprise at least one positioning structure disposed so as to act as a stop-gate for positioning the pop-up mirror in a reflective state. The positioning structure may comprise a pillar-like structure extending from a second microelectronic substrate that is in a fixed positional relationship relative to the first microelectronic substrate. The positioning structure may be electrostatically activated through a voltage source connected to the second substrate such that electrostatic activation of the positioning structure causes the pop-up mirror to be "locked" in the "upright", reflective state. In addition, the MEMS optical cross-connect. switch of this embodiment may comprise a tether device that may be electrostatically activated through connection to the first substrate to provide a "clamp-down" voltage to the pop-up mirror in the pop-up mirror's prone, non-reflective state.

In another embodiment of the present invention the MEMS optical cross-connect switch comprises a first microelectronic substrate having a pop-up mirror disposed on the surface of the substrate and a positioning structure disposed in a fixed positional relationship relative to the first microelectronic substrate. The positioning structure serves to position the pop-up mirror when the mirror has been actuated to a reflective state. The positioning structure may comprise a pillar-like structure extending from a second microelectronic substrate that is in a fixed positional relationship relative to the first microelectronic substrate. The positioning structure may be electrostatically activated through a voltage source connected to the second substrate such that electrostatic activation of the positioning structure causes the pop-up mirror to be "locked" in the "upright", reflective state. The actuation mechanism for this embodiment may comprise a magnetic field source. Additionally, the magnetic field source may be a rotational magnetic field source having the capability to be variably controlled. Additionally, a magnetic pole piece may be positioned within or proximate the second microelectronic substrate to assure that the pop-up mirror has sufficient magnetic torque to allow for the mirror to reach the desired fully "upright", reflective state.

In yet another embodiment of the present invention, a method for cross-connect switching of optical signals in a microelectronic device comprises the steps of receiving an input signal on an optical path, generating a rotational magnetic field to actuate a pop-up mirror from a non-reflective state to a reflective state and reflecting the input signal off the pop-up mirror on another optical path. Additionally, the method may comprise maintaining position of the pop-up mirror in the reflective state by restricting movement of the pop-mirror with a positioning structure. An alternate step may comprise clamping electrostatically the pop-up mirror in a reflective state by applying voltage to the associated positioning structure.

An additional method for cross-connect switching of optical signals in a microelectronic device comprises the steps of receiving an input signal on an optical path, actuating magnetically a pop-up mirror from a non-reflective state to a reflective state, maintaining positioning of the pop-up mirror at a reflective position and reflecting the input signal off the pop-up mirror on another optical path. The step of maintaining positioning may further comprise restricting the actuation of the pop-up mirror with at least one positioning structure, such as a positioning structure extending from a microelectronic substrate. The step of actuating magnetically may comprise generating a rotational magnetic field to actuate the pop-up mirror from a non-reflective state to a reflective state.

Additionally, the present invention is embodied in an optical cross-connect switch array that comprises a first microelectronic substrate having at least two pop-up mirrors disposed on the surface of the first substrate and a rotational magnetic field source disposed proximate the first microelectronic substrate. The cross-connect switch array may comprise at least two positioning structures disposed in a fixed positional relationship relative to the first microelectronic substrate so as to serve to position the pop-up mirror in a reflective state. The positioning structures may comprise pillar-like structures extending from a second microelectronic substrate that is held in a fixed positional relationship relative to the first microelectronic substrate. Typically, the array will comprise n columns and m rows of pop-up mirrors and corresponding positioning structures aligned so as to allow for a non-blocking, one-to-one switching matrix.

In yet another embodiment of the present invention, an optical cross-connect switch array may comprise a first microelectronic substrate having at least two pop-up mirrors disposed on the surface of the first substrate and a second microelectronic substrate disposed in a fixed positional relationship relative to the first microelectronic substrate. The second microelectronic substrate having at least two positioning structures extending therefrom towards the first microelectronic substrate. The positioning structures serve to restrict further movement of the pop-up mirror beyond the position of the reflective state. The pop-up mirrors of the array may be actuated by a magnetic field source, such as a rotational magnetic field source. Typically, the array will comprise n columns and m rows of pop-up mirrors and corresponding positioning structures aligned so as to allow for a non-blocking, one-to-one switching matrix.

In yet another embodiment of the present invention, an optical cross-connect switch array may comprise a first microelectronic substrate having at least two pop-up mirrors disposed on the surface of the first substrate and a second microelectronic substrate disposed in a fixed positional relationship relative to the first microelectronic substrate. Additionally this embodiment includes a magnetic field source that provides for a magnetic field oriented with respect to the first microelectronic substrate to interact with the at least two pop-up mirrors and at least two magnetic pole pieces disposed proximate to the second microelectronic substrate to provide for further magnetic attraction of the pop-up mirror.

The present invention is also embodied in a MEMS optical cross-connect switching system having a first microelectronic substrate, at least one optical fiber input and two optical fiber outputs disposed about the perimeter of the first microelectronic substrate, at least one pop-up mirror disposed proximate the first microelectronic substrate and a rotational magnetic field source that actuates the pop-up mirrors from a non-reflective state to a reflective state. An optional MEMS optical cross-connect switching system may comprise a first microelectronic substrate, at least one optical fiber input and two optical fiber outputs disposed about the perimeter of the first microelectronic substrate, at least one pop-up mirror disposed proximate the first microelectronic substrate and a second microelectronic substrate disposed in a fixed positional relationship relative to the first microelectronic substrate. The second microelectronic substrate having at least one positioning structure extending therefrom towards the first microelectronic substrate. The positioning structure serves to restrict further movement of the pop-up mirror beyond the position of the reflective state.

The MEMS optical cross connect switch of the present invention benefits from having a rotational magnetic field source that serves as the mechanism for actuation. In this fashion, the pop-up mirrors can be fully and repetitiously actuated from non-reflective state to reflective state. Additionally, the invention provides for the use of magnetic pole pieces as an alternative option to fully and repetitiously actuate the pop-up mirror from a non-reflective state to a reflective state. In another embodiment, the present invention employs positioning structures, such as pillar-like structures, that serve as stop-gates for the pop-up mirrors as they reach their respective reflective states. Moreover, the pop-up mirrors can be "locked-in" to the reflective state by applying electrostatic voltage across the positioning structures. The unique design of the positioning structures allows for a switch array to be configured that provides for a non-blocking, one-to-one operable switch array, such that, setting one switch element to route one input fiber will not interfere with the setting of other switch elements intended to route other input fibers. Also, the present invention provides for scaleable array architecture thus, allowing for numerous input fibers to be routed to output fibers as dictated by the application. The free-space, MEMS technology Fiber optical switch of the present invention limits insertion loss by providing for a stationary reflective state that allows for optical fibers to be redirected in a reliable fashion.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein, rather, these embodiments are provided so that this disclosure will be thorough and complete, and will fully convey the scope of the invention to those skilled in the art. Like numbers refer to like elements throughout.

Figure 1:
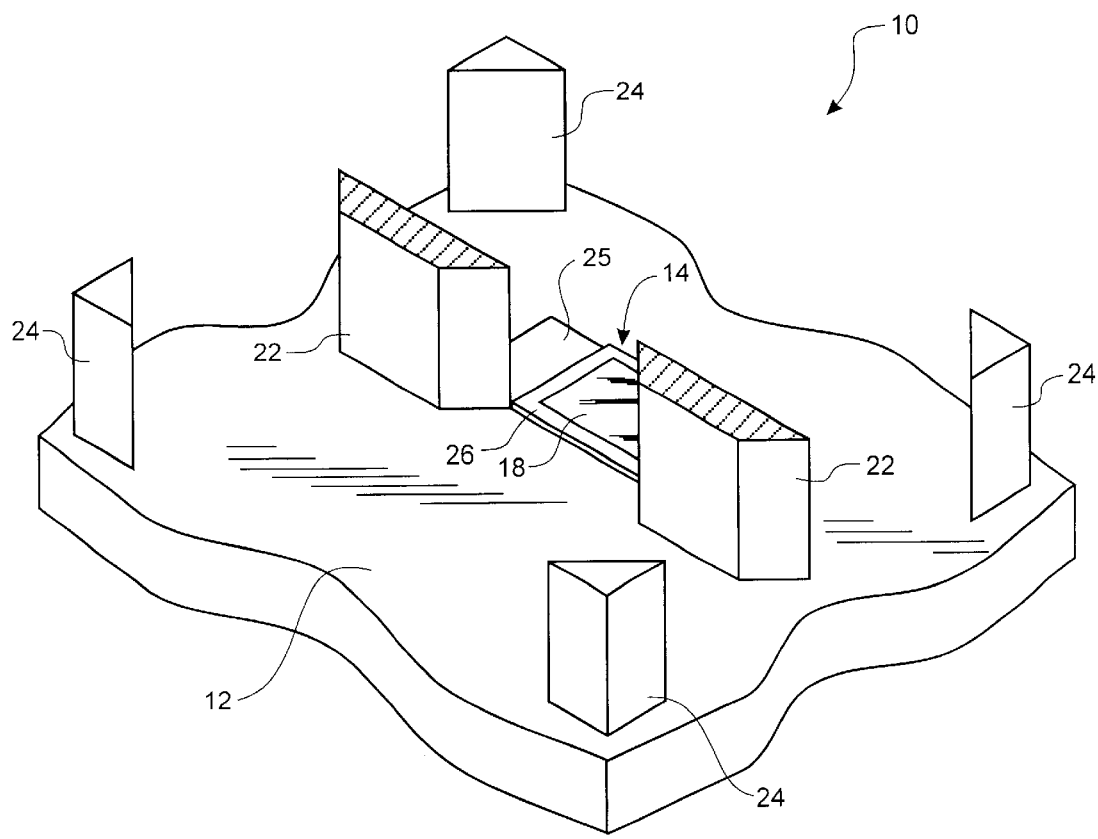
FIG. 1 is a perspective view of a MEMS optical cross-connect switch illustrating the positional relationship between the non-reflective state pop-up mirror and the positioning structures in accordance with an embodiment of the present invention.
Figure 2:
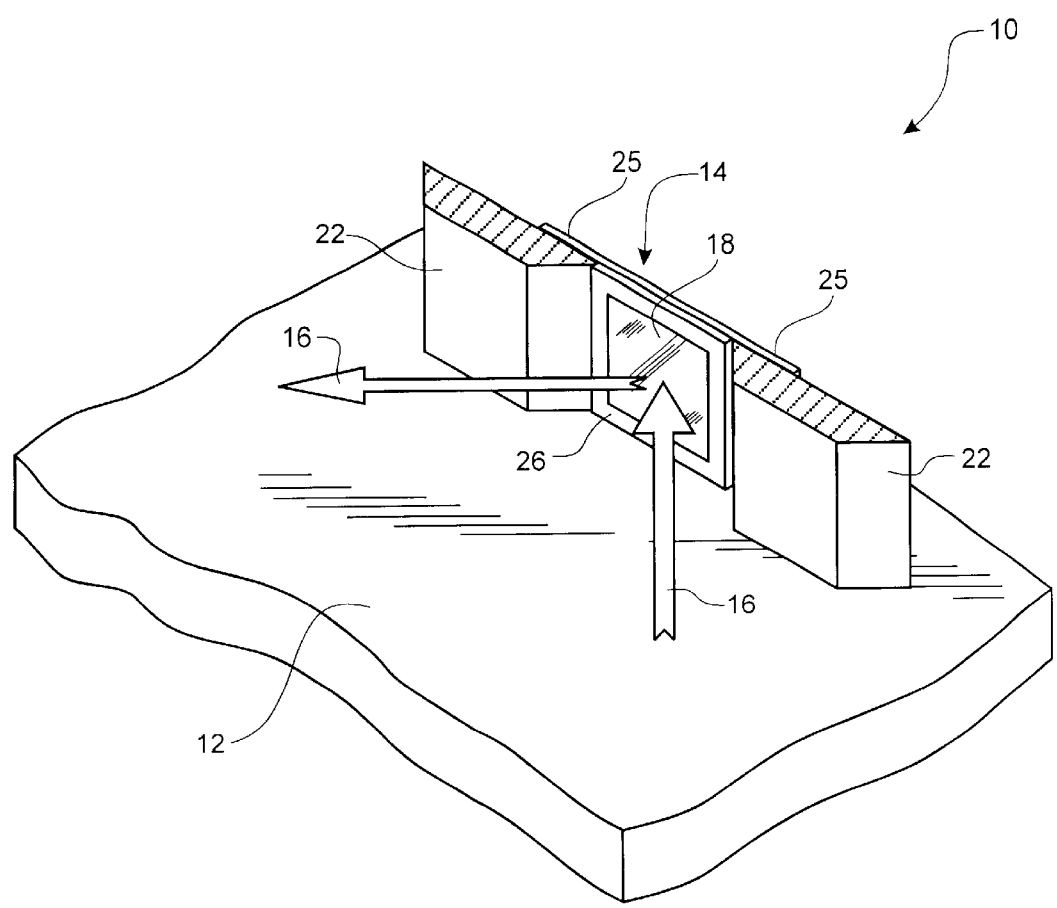
FIG. 2 is a perspective view of a MEMS optical cross-connect switch illustrating the positional relationship between a reflective state pop-up mirror and the positioning structures in accordance with an embodiment of the present invention.

Referring to FIGS. 1 and 2 shown are perspective views of a microelectromechanical (MEMS) optical cross-connect switch in accordance with an embodiment of the present invention. The cross-connect switch 10 includes a first microelectronic substrate 12 having a generally planar surface. The first microelectronic substrate may comprise silicon, although other suitable semiconductor materials may also be used to form the first microelectronic substrate. A pop-up mirror 14 is disposed on the surface of the first substrate. In the FIG. 1 illustration the pop-up mirror is positioned in a plane that lies generally parallel to the surface of the first microelectronic substrate. In this pop-up mirror orientation, referred to herein as the non-reflective state, the optical signals may pass by the mirror construct without being altered or reflected. In the FIG. 2 illustration the pop-up mirror is positioned in a plane that lies generally perpendicular to the surface of the first microelectronic substrate. In this pop-up mirror orientation, referred to herein as the reflective-state, an optical signal, represented in FIG. 2 by arrows 16, will contact the reflective surface 18 of the pop-up mirror and change the optical path of the signals.

The optical cross-connect switch may also comprise a second microelectronic substrate that is disposed in a fixed positional relationship relative to the first microelectronic substrate. The second microelectronic substrate is not shown in the simplified perspective views of FIGS. 1 and 2, however, the second microelectronic substrate 20 is shown in the cross-sectional side views of FIGS. 4A–4C and the perspective view of FIG. 7. One or more positioning structures are disposed relative to the first microelectronic substrate and the pop-up mirror so that they act to impede further movement of the pop-up mirror beyond the desired reflective state. In the embodiments shown in FIGS. 4A–4C and 7 the positioning structures 22 are pillar-like structures extending from the second microelectronic substrate toward the planar surface of the first substrate. In these embodiments the positioning structures will, typically, approach but not contact the first. microelectronic substrate to assure electrical isolation between the first and second microelectronic substrates. It is also possible to dispose an insulating layer either on the first microelectronic substrate or on the distal portion of the positioning structures that will allow the positioning structures to come into contact with the first microelectronic substrate. Those skilled in the art will realize that it is also possible and within the inventive concepts herein disclosed to dispose the positioning structures in other fixed positional relationships relative to the pop-up mirror and the first microelectronic substrate. The fixed positional relationship will be dictated by the ability of the positioning structures to restrict further movement of the pop-up mirror when the pop-up mirror has been activated to a reflective state. The second microelectronic substrate and thus, the positioning structures may comprise <110> crystal silicon, although other suitable semiconductor materials may also be used to form the second semiconductor material and positioning structures. The material chosen to comprise the second semiconductor substrate will preferably have characteristics that allow for the precision facing required of the positioning structures.

In the embodiment shown in FIGS. 1 and 2 the positioning structures 22 extend toward the planar surface of the first substrate but do not contact the planar surface of the first substrate. Thus, the positioning structures do not provide a means. for the fixed positional relationship between the first and second microelectronic substrates and, as such, support structures 24 as shown in FIG. 1 are typically positioned around the outer edge of the planar surface of the first microelectronic substrate. The support structures serve to provide the fixed positional relationship between the first and second microelectronic substrates.

Additionally, in the depicted embodiment of FIG. 2 the pop-up mirror 14 is restricted from further movement by two positioning structures 22. In this embodiment the tabs 25 attached to the sides of the pop-up mirror will contact an edge of a precision face of each positioning structure to restrict the movement of the pop-up mirror. It is also possible and within the inventive concepts herein disclosed to configure the positioning structures so that the pop-up mirror contacts and is restricted by only one positioning structure. In a single positioning embodiment, the pop-up mirror may have only one tab affixed to the side of the mirror that will make contact with the positioning structure. Additionally, other facings or surfaces of the positioning structures may restrict the pop-up mirror. Positioning structures may be formed so that the top edge of the pop-up mirror (i.e. the edge furthest from the mirror-to-substrate connection point) serves to restrict further pop-up mirror movement. In such an embodiment, the tab may be affixed to the top edge of the pop-up mirror. Conversely, positioning structures may be formed so that the bottom edge of the pop-up mirror (i.e. the edge closest to the mirror-to-substrate connection point) serves to restrict further pop-up mirror movement. In this embodiment, the tab structure may be affixed to the bottom edge of the pop-up mirror structure. The positioning structure of the present invention may also be embodied in a recess in the underside of the second microelectronic substrate. In such an embodiment, a tab may be affixed to the top edge of the pop-up mirror. As the pop-up mirror approaches the reflective state, the tab will contact an interior surface of the recess to restrict further movement of the pop-up mirror.

Figure 3:
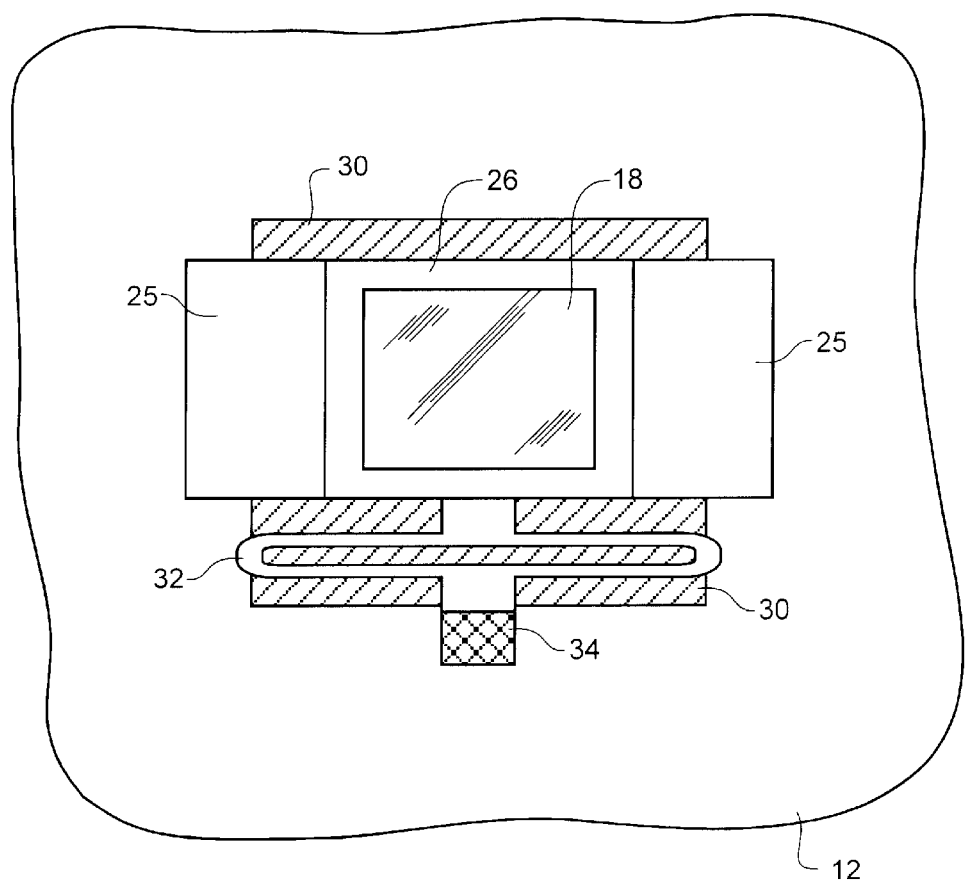
FIG. 3 is a top view of a MEMS pop-up mirror and the associated tether device and substrate anchor in accordance with an embodiment of the present invention.

The pop-up mirror 14 construct is shown in more detail in the top view perspective of FIG. 3. The pop-up mirror is disposed on a generally planar surface of the first microelectronic substrate 12. A sacrificial layering process employed during the fabrication of the pop-up mirror allows for the mirror to be released from the surface of the first substrate and overlie a shallow trench 30 in the first substrate. The trench serves to provide electrical isolation between the pop-up mirror and the substrate and serves to limit problems related to the pop-up mirror sticking to the substrate (commonly referred to as "stiction" force by those of ordinary skill in the art) during fabrication and during device use. In lieu of fabricating a trench, it may also be possible to texture the underside of the pop-up mirror, the substrate or both surfaces with a dimple-like array pattern. The dimpled surface would provide less contact surface area between the mirror and substrate, thus, lessening the problems encountered with stiction. The tabs 25, which serve to restrict further movement of the pop-up mirror upon actuation, rest upon the substrate in the non-actuated position and serve to support the pop-up mirror above the trench. The tabs may be electrically conductive so that a clamping voltage applied to the tabs may serve to lock the pop-up mirror in an actuated reflective position or in a non-actuated, non-reflective position.

A tether device 32 is used to impart mobility to the pop-up mirror and provide an electrical path for transmitting electrostatic voltage to the tabs of the pop-up mirror. As shown in FIG. 3, the tether device may comprise an elongated oval shaped tether, commonly referred to as a hairpin tether. This configuration of the tether provides for a robust and flexible construct that is capable of providing for a reliable pop-up mirror. The use of tether devices and more specifically, hairpin tethers is shown by way of example. Other tether configurations and flexible hinge type mechanisms may also be used to impart the requisite mobility to the attached pop-up mirror. For clarity sake only, FIGS. 1, 2 and 7A–7B do not illustrate a tether device or hinge type mechanism. The tether device is attached to the substrate at an anchor 34. An external source of electrostatic energy (not shown in FIG. 3) applies voltage at the anchor that is transmitted across the tether device to the tabs. The electrostatic voltage provides the energy necessary to activate the tether device. In an active state the tether device imparts the force necessary to hold the pop-up mirror in the stationary non-reflective state (i.e. generally parallel with the substrate). In this embodiment the activated hairpin tether will exhibit a bending and/or twisting of the oval-shaped tether. Once electrostatic voltage is no longer transmitted across the tether device, the tether returns to a relaxed state and the pop-up mirror is unrestrained and free to rotate about the axis defined by the tether.

The tether device 32, the anchor 34, the tabs 25 and the underlying base plate of the pop-up mirror (not shown in FIG. 3) may comprise an analogous material, such as polysilicon. It is also possible to form the tether device, the anchor, the tabs and the underlying base plate from other flexible, electrically conductive materials. In instances in which the anchor, the tether device, the tabs and the underlying base plate of the pop-up mirror comprise one material, such as polysilicon, it is possible to form the structures during a single fabrication process. The reflective surface 18 of the pop-up mirror may be formed from gold or other suitable reflective materials may also be used to form the reflective surface. The frame 26 structure that surrounds the periphery of the reflective surface may comprise electro-plated nickel. The frame of the pop-up mirror provides rigidity to the overall pop-up mirror construct and, in some embodiments, provides for a magnetically active material. Other materials that provide similar characteristics may also be used to form the frame structure.

In one present embodiment of the invention the pop-up mirror is actuated by the use of a magnetic field created between the first and second microelectronic substrates. As a magnetic field is applied between the first and second substrates a magnetically active pop-up mirror will attempt to align itself with the direction of the field. As previously discussed, an electrostatic field may be applied to the pop-up mirror to hold the mirror in a stationary non-reflective position (i.e. parallel with the first substrate). If a magnetic field is employed, the electrostatic field must be of such strength that it overrides the magnetic field. Once the electrostatic field is removed, the magnetic field is dominant and serves to provide the force necessary to actuate the pop-up mirror. In an embodiment using magnetic field actuation the frame may serve as the magnetically active component of the pop-up mirror. The magnetic field that may be used may comprise external permanent magnets, electromagnets and any other magnets capable of (generating the requisite magnetic field.

Figure 4A:
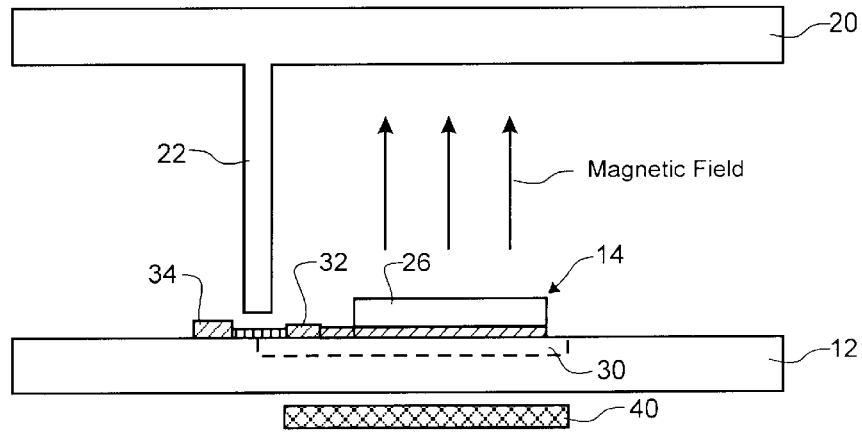
FIGS. 4A–4C are cross-sectional side views of a MEMS optical cross-connect switch illustrating the magnetic actuation process as the pop-up mirror proceeds from a "down", non-reflective state to an "upright", reflective state in accordance with an embodiment of the present invention.
Figure 4B:
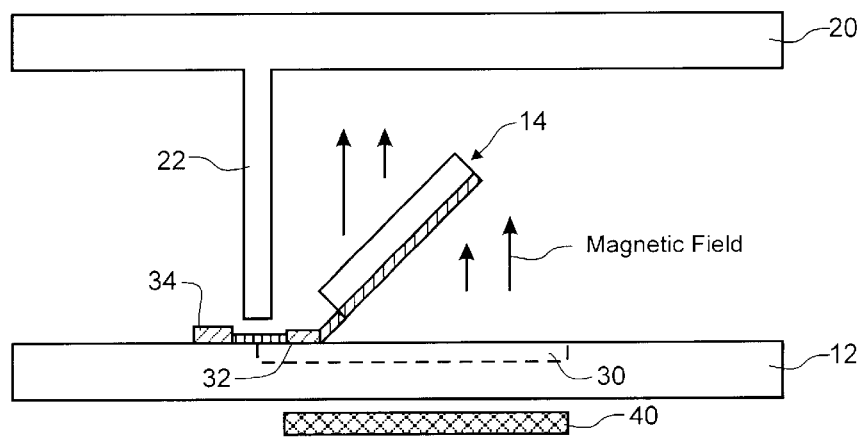
Figure 4C:
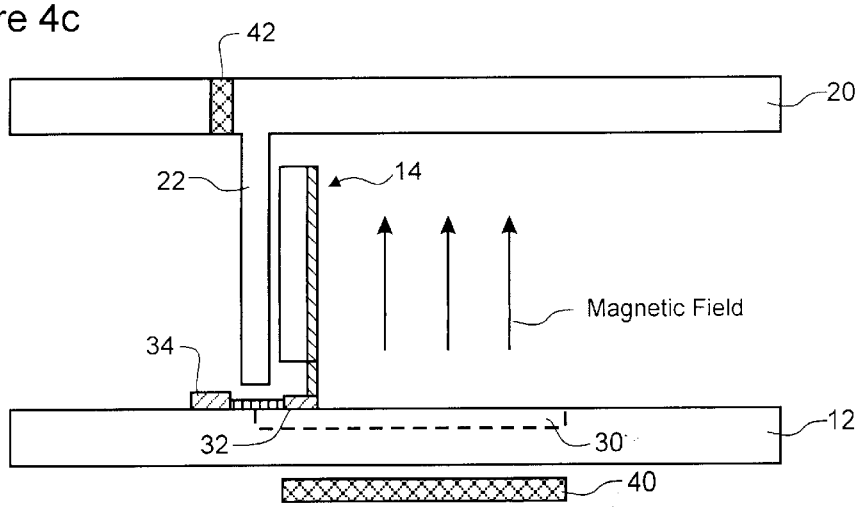

In a present embodiment of the invention the optical cross connect switch may employ an external magnetic field that generates a magnetic field generally perpendicular to the planar surface of the first substrate. Such a magnetic field may be generated by the use of a permanent magnet or electromagnets. The requisite magnetic field will typically be on the order of 200–500 gauss. FIGS. 4A–4C are side cross-sectional views depicting an embodiment of the invention that has a magnetic field generally perpendicular to the planar surface of the first substrate. In FIG. 4A the magnetic torque on the pop-up mirror 14 (more specifically, the magnetically active component) starts from a low torque stage when the clamp down voltage is released and the pop-up mirror 14 is in the initial position parallel to the surface of the first substrate 12. An electromagnet magnet 40 is located below the surface of the first substrate and serves to generate a magnetic field generally perpendicular to the first and second microelectronic substrates. The magnetic field will cause the magnetic component of the pop-up mirror to align with the axis of the magnetic field, creating torque acting against the torsion of the tether device. The use of an electromagnet is shown by way of example. Other magnetic field generators, such as permanent magnets, may also used to generate the requisite magnetic field. Additionally, the illustrated location of the magnetic field generator is by way of example. The strength and direction of the desired magnetic field dictate the location of the magnetic field generator.

As shown in FIG. 4B, the pop-up mirror passes through a maximum torque stage when the pop-up mirror is generally about 45 degrees from the initial position parallel to the first substrate, i.e. 45 degrees respective of the orientation of the magnetic field. Once the pop-up mirror actuates past the maximum torque stage it begins to decrease until a second low torque stage, is exhibited when the pop-up mirror is generally about 90 degrees from the initial position or perpendicular with the first substrate. FIG. 4C depicts the second low torque stage. In most applications the desired reflective state will be generally about 90 degrees from the initial position or perpendicular with the first substrate. It is the second low torque stage, at the 90 degree level, that prevents the pop-up mirror from fully "popping-up" into a stationary position or reliably cycling between the initial parallel position and the fully upright, reflective state position. This problem is exasperated by the effects of the tether device which serves to provide the pop-up mirror with a counter-active restoring force as the pop-up mirror approaches the fully upright, reflective state position. To mitigate this problem the present invention may include a magnetic pole piece 42 (shown in FIG. 4C) disposed within the second microelectronic substrate. The magnetic pole piece may comprise a magnetic material, such as a ferrite-based material. The magnetic pole piece is typically disposed within the second microelectronic substrate so as to provide heightened magnetic torque at the second low torque stage. Effectively, the addition of a pole piece serves to increase the magnetic field as the pop-up mirror approaches the fully upright position. By increasing the magnetic field the tabs 25 of the pop-up mirror will contact an edge of a facing of the positioning structure 22 and serve to hold the pop-up mirror in a relatively stationary reflective state.

Figure 5:
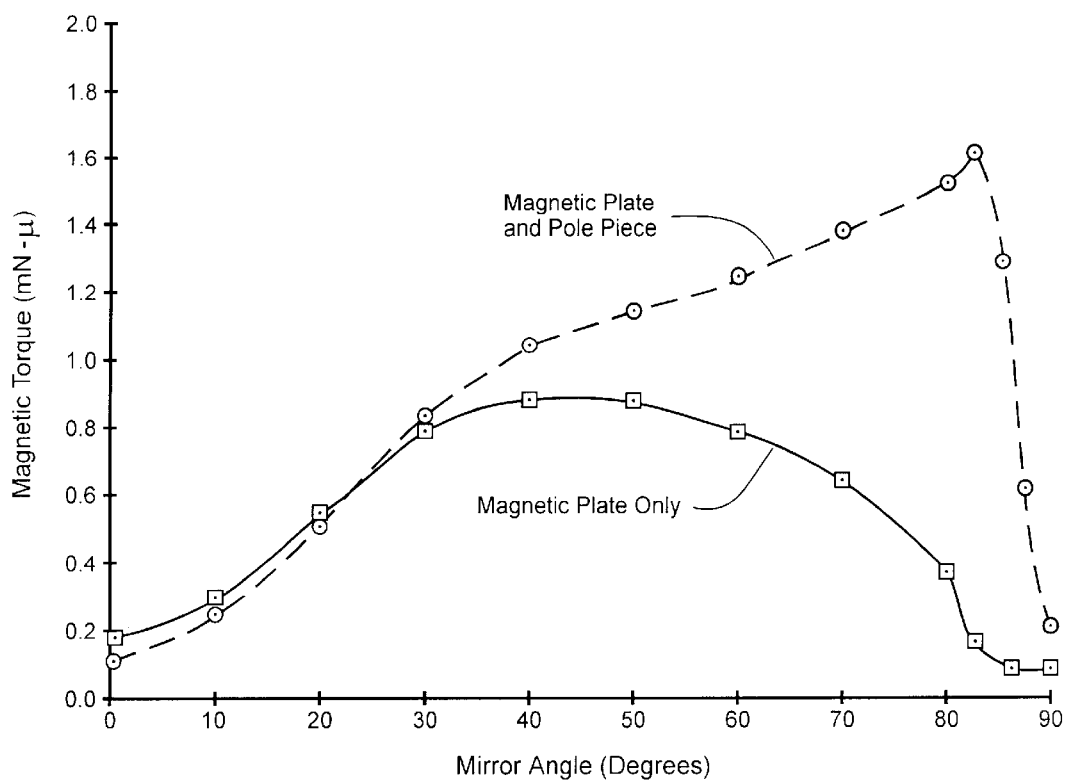
FIG. 5 is a graph of magnetic torque versus mirror angle highlighting the differences in magnetic torque for an embodiment using only a constant magnetic field source and an embodiment using an a constant magnetic field source and a magnetic pole piece in accordance with an embodiment of the present invention.

FIG. 5 shows a plot of magnetic torque versus pop-up mirror angle for an embodiment using a magnetic plate and a pole piece versus an embodiment using solely a magnetic plate. In this example the pole piece was disposed offset from the fully upright, reflective position of the pop-up mirror, similar to the positioning shown in FIG. 4C. It is noted that for the embodiment deploying only a magnetic plate the maximum torque peaks between about 40 and 50 degrees and as the torque decreases beyond the 50 degree range the pop-up mirror has difficulty achieving a fully upright position. This is contrasted with the embodiment using the pole piece and magnetic plate in which the pop-up mirror reaches a maximum torque at about 80 to about 85 degrees and maintains a requisite level of torque as the pop-up mirror approaches the fully upright 90 degree level.

Additionally, another embodiment of the present invention may use a variably controlled magnetic field source to create a rotational magnetic field that maximizes the magnetic torque supplied to the pop-up mirror throughout the actuation period. Such a variably controlled magnetic field source may include single or paired electromagnets in the form of wire coils, such as Helmholtz coils, split-gap solenoids, "saddle" coils or similar air core technology magnets. It is also possible to use ferrite core magnetics to generate a variably controlled magnetic field, however, multiple magnetic return paths and packaging constraints may impede the desired performance characteristics. In an embodiment using wire coil pairs, the pairs are typically disposed proximate the optical cross connect switch so that they generate generally orthogonal magnetic field components. In one such arrangement a first magnetic field is created generally perpendicular to the planar surface of the first and second substrate. The second magnetic field is created generally parallel to the planar surface of the first and second microelectronic substrate and generally perpendicular to the axis of rotation of the tether device or hinge structure.

Figure 6:
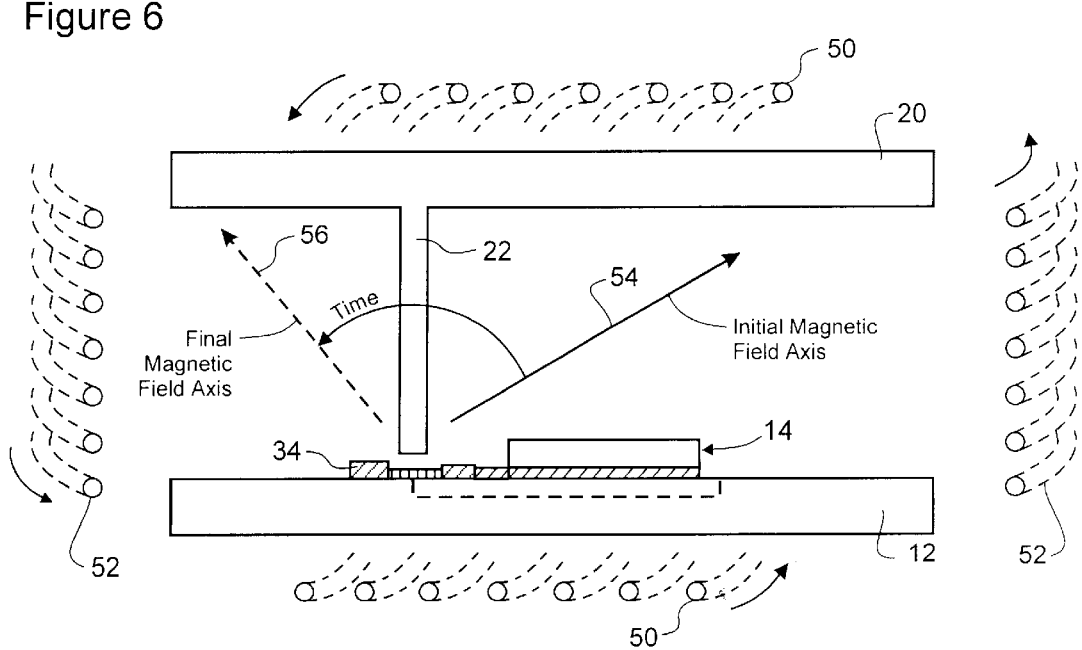
FIG. 6 is a cross-sectional side view of a MEMS optical cross-connect switch illustrating the use of variably controlled magnetic fields to effectuate full upright actuation of the pop-up mirror in accordance with an embodiment of the present invention.

As shown in the cross-sectional view of FIG. 6. a first variably controlled wire coil 50 is wound about and encircles the area beneath the first microelectronic substrate and the are above the second microelectronic substrate. Coil 50 venerates a magnetic field that is generally perpendicular to the planar surface of the first and second substrates. A second variably controlled wire coil 52 is wound about and encircles opposite sides of the first and second microelectronic substrates. Coil 52 generates a magnetic field that is generally parallel to the planar surface of the first and second substrates. In the arrangement as depicted the wire coils will generally encase the entirety of the first and second microelectronic substrate. The location of the wire coil pairs is shown by way of example. Additionally, coil pairs are shown by way of example, it is also possible to generate a variably controlled magnetic field using a single coil.

The wire coil pairs may be disposed in predetermined locations proximate to the first and second substrates such that the composite initial magnetic field has a first magnetic axis 54 generally about 45 degrees askew to the surface of the first substrate. By varying the ratio of the current applied to the first coil versus the current applied to the second coil the magnitude and the direction of the applied magnetic field can be controlled. For instance, by varying the currents applied to the coils during the pop-up mirror actuation process it is possible to rotate the magnetic field by about 90 degrees over a predetermined time period, effectively providing the pop-up mirror with maximum magnetic torque throughout the actuation process. Thus, as the pop-up mirror approaches a filly upright, reflective state the final magnetic field has a second magnetic axis 56 generally about 135 degrees askew to the surface of the first substrate. The period of time over which the magnetic field axis is rotated will be dictated by many factors, including the speed at which the pop-up mirror travels. The controlled variance in the magnitude and direction of the magnetic field allows for the pop-up mirror to benefit from a constant maximum magnetic torque throughout the actuation process. In implementing a variably controlled magnetic field source, the pop-up mirror is reliably capable of attaining a fully upright, reflective state that is in constant contact with the edge of a facing of at least one positioning structure 22.

The use of a variably controlled magnetic field makes it possible to use overall lower powered magnetic fields, i.e. lower currents, in general. By way of example, it is possible to use air core electromagnets having magnetic fields of about 200 gauss and by varying the current supplied to these electromagnets by about 1 to about 3 amps it is possible to actuate the pop-up mirror into a fully upright, reflective state. Additionally, the use of a rotational magnetic field in many applications would lessen the need to implement the use of pole pieces in the second microelectronic substrate. The use of variably controlled magnetic fields allows for the field direction axis to be controlled throughout a 360 degree radius, thus, circumventing the need for a pole piece. By eliminating the use of pole piece magnets the overall fabrication of the optical cross-connect switch is simplified.

It should be noted that the use of a variable controlled magnetic field to create a rotational magnetic field is not limited by the mechanical configuration of the positioning structure used to restrict the pop-up mirror from further actuation (i.e. position the pop-up mirror in a reflective state). As such, the variable controlled magnetic field concept may be used with any optical switch requiring magnetic actuation and such embodiments are within the scope of the present invention. While the discussion and illustrations are drawn to embodiments having the positioning structures of the present invention, the variable controlled magnetic field can be used with other switches having any feasible means of restricting further movement of the switch.

Referring again to FIGS. 1 and 2, the positioning structures 22 are used to restrict further movement of the pop-up mirror when the pop-up mirror has been actuated to allow for optical signal reflection. Once voltage is released from the tether device, the pop-up mirror is no longer electrically constrained in the "down" position. The magnetic field becomes dominant and allows the magnetically active component of the pop-up mirror to align itself in the direction of the magnetic field. As the pop-up mirror achieves the desired reflective state it is necessary to stabilize or "lock in place" the position of the pop-up mirror so that the reflected optical signal travels in a highly uniform desired path. Additionally, the positioning structures, such as the pillar-like structures, may be used to electrostatically "lock" the pop-up mirrors into the fully upright, reflective state. Once the tabs 25 of the pop-up mirror 14 contact an edge of a facing of at least one positioning structure an electrostatic voltage is applied from an external source through the second microelectronic substrate to the positioning structure. This electrostatic force serves to "lock" the pop-up mirror into the upright, reflective state. The electrostatic locked position is desired for the duration of the optical signal reflection period to insure that signal loss is minimized and that optical signal paths are repeatable. Once an optical signal has been reflected or the reflection state is no longer desired the pop-up mirror can be actuated to the "down" position, parallel to the first substrate by releasing the clamping voltage applied to the positioning structure(s). The force of the tether device alone may be sufficient to cause the pop-up mirror to actuate into the "down" position. In instances in which the tether device provides the necessary force to release the pop-up mirror into the non-reflective "down" position it may be possible to do so without generating a reverse magnetic field.

Figure 7A:
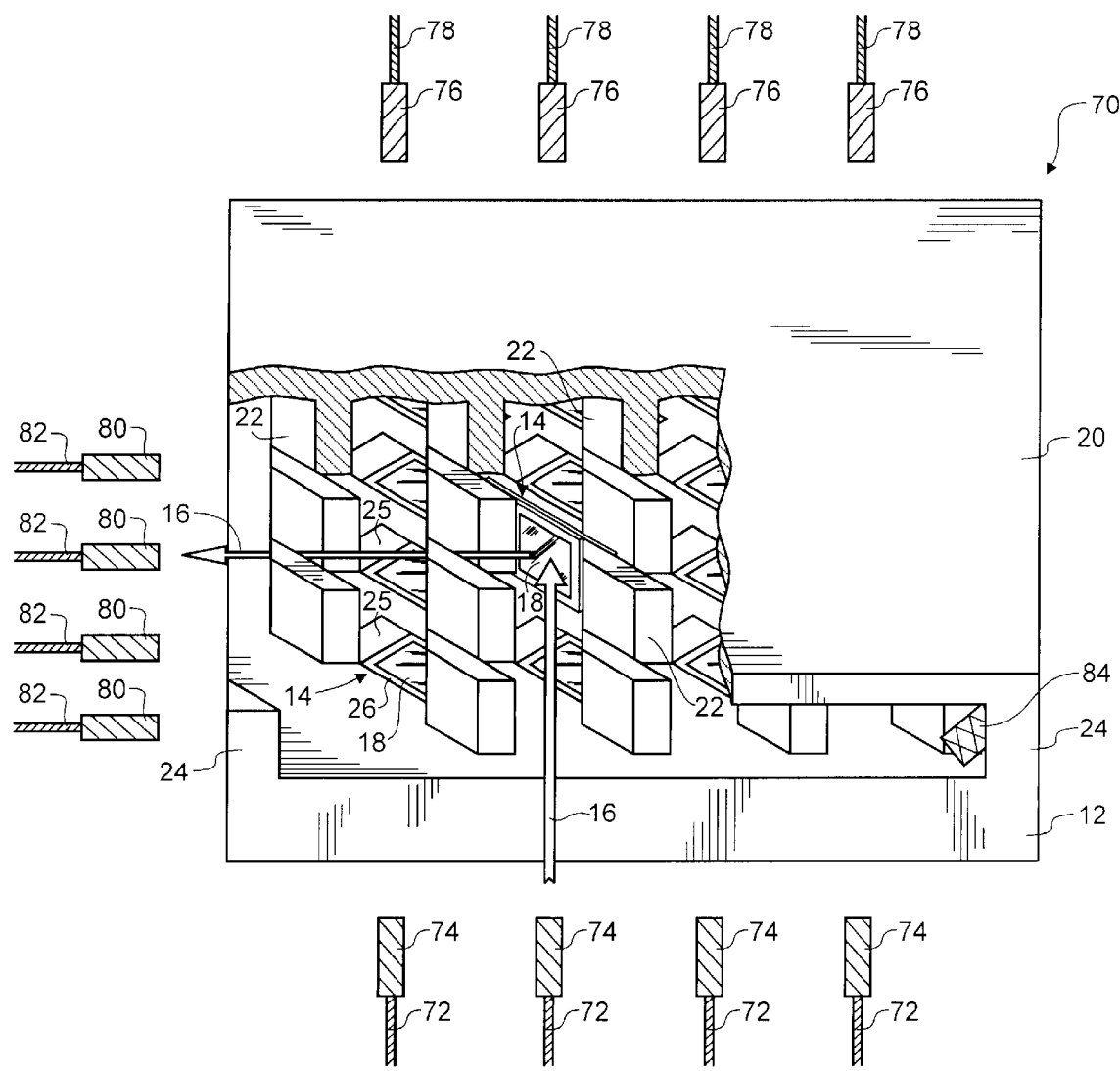
FIGS. 7A–7B are a perspective views of a MEMS optical cross-connect switch array illustrating the switching capabilities of a multi pop-up mirror array in accordance with an embodiment of the present invention.
Figure 7B:
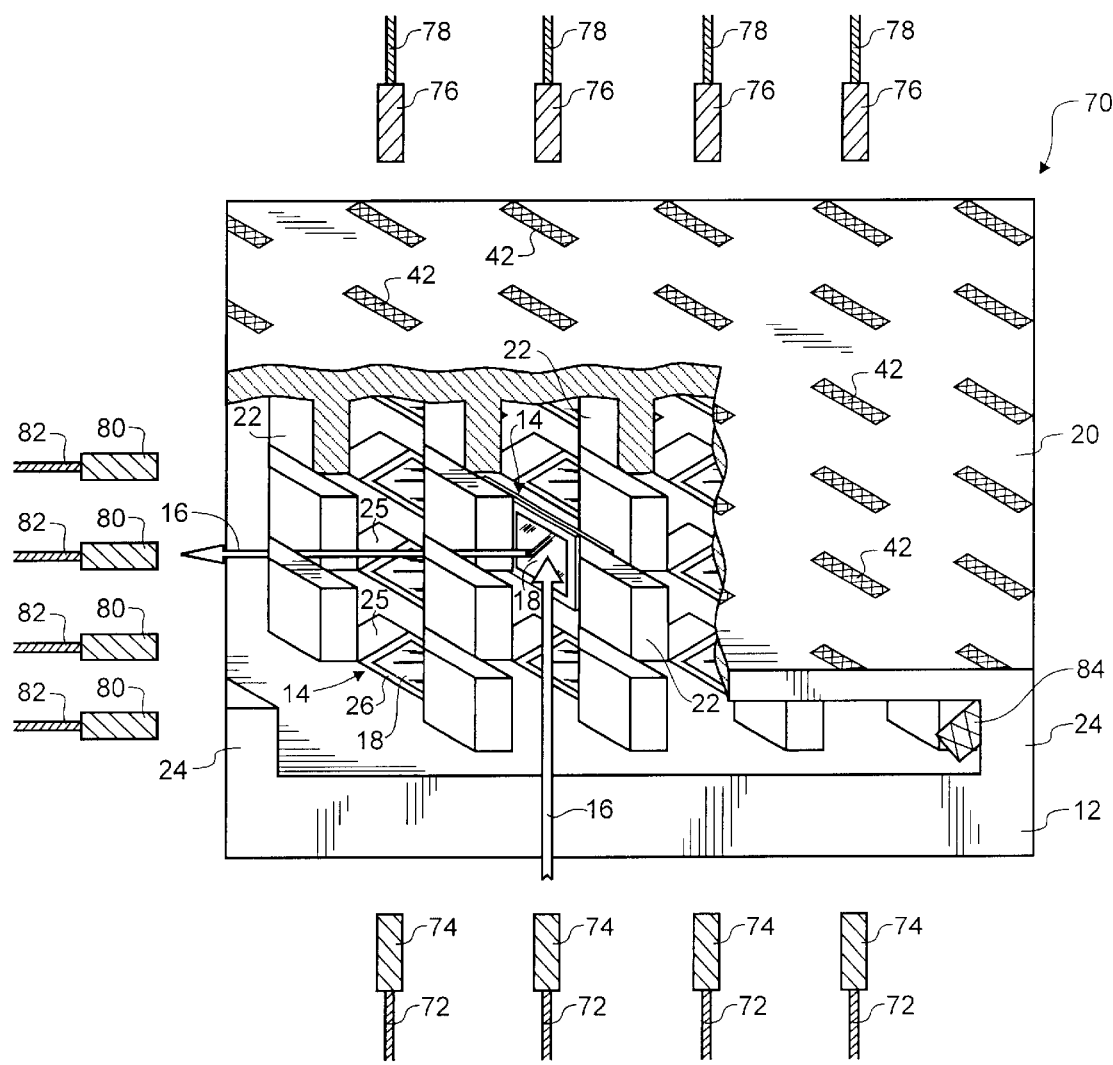

Additionally, the present invention is embodied in multiple pop-up mirrors configured in an array formation. FIGS. 7A–7B illustrate perspective views of an optical cross-connect switch array 70 using pop-up mirrors 14 and positioning structures 22 in accordance with an embodiment of the present invention. The cross-connect switch array 70 includes a first microelectronic substrate 12 having a generally planar surface. The first microelectronic substrate may comprise silicon, although other suitable semiconductor materials may also be used to form the first microelectronic substrate. Lensed fibers are positioned around the perimeter of the first microelectronic substrate with their optical axis parallel to the plane of the substrate. An array of pop-up mirrors 14 are disposed on the surface of the first substrate at the intersections of row and column fibers and oriented at 45 degrees to the input fibers 72 The input lens 74 produce a collimated optical beam 16, approximately about 150 micrometers in diameter, which either passes over a pop-up mirror (in its prone, non-reflective state) or is reflected by the pop-up mirror (in its upright, reflective state). In the instance in which the optical beam passes over all the pop-up mirrors in a column, the beam will exit to an output lens 76 positioned adjacent to the column and result in associated output fiber 78. In the instance in which the optical beam is reflected by a pop-up mirror, the beam will follow the path of a row and exit to an output lens 80 positioned adjacent to the row and result in associated output fiber 82. Each pop-up mirror in the array is independently addressable so that any input fiber can be allowed to pass uninterrupted or redirected by reflection to any one of the output fibers associated with a column or a row.

The formation of the switch array shown in FIGS. 7A–7B is by way of example. Pop-up mirror architecture on the substrate is dictated by the need to integrate multiple switch elements (i.e. pop-up mirrors) into an n×n or m×n switch array, where m and n are integers in the range of 2 to 256, preferably 2 to 128. The array should be capable of non-blocking one-to-one operation, i.e. setting one switch element to route fiber A should not interfere with the setting of fiber B, etc. For an embodiment in which each pop-up mirror is stop-gated by two positioning structures the n×n switch array will further comprise $(n^2+n+(n-1))$ positioning structures aligned in n+1 columns and n+1 rows, wherein n is an integer greater than one.

In operation, the pop-up mirror may be held in a down or non-reflective state by applying an electrostatic force to the mirror. As previously discussed, this electrostatic force may be generated by an external voltage supply that is in electrical communication with the mirror via the anchor. Electrical connection is made through a contact 84 connecting the anchor elements to the substrate, as such, the pop-up mirrors are electrically isolated from the substrate. Applying a voltage between the pop-up mirror and the first substrate creates the electrostatic force that must be sufficient to resist the torque induced by the opposing magnetic field. Once the clamp down voltage is released a magnetic field is provided that allows the pop-up mirror to be actuated into a reflective state. The magnetic field (not shown in FIGS. 7A–7B) is disposed proximate to the cross-connect switch and may comprise a pulsed magnetic field, a variably controlled magnetic field or any other suitable magnetic field generator. As the pop-up mirror approaches a fully upright, reflective state it comes in contact with positioning structures 22.

As shown in the cut-away view of FIG. 7A–7B the positioning structures extend from a second microelectronic substrate 20 and lead to, but do not contact the first microelectronic substrate. The second microelectronic substrate is disposed in a fixed positional relationship relative to the first microelectronic substrate. The fixed positional relationship between the first and second microelectronic substrates may be defined by support structures 24 disposed on the surface of the first substrate that connect with the second substrate. The positioning structures, such as the positioning structures, serve as "stop-gates" for the tabs of the pop-up mirrors and provide for the electrostatic clamping of the pop-up mirrors in their upright, reflective state. As the pop-up mirror is actuated into the upright reflective state, a facing of the tabs 25 will contact a facing of one or more positioning structures. Preferably, the pop-up mirror will contact two positioning structures. An electrostatic voltage is applied between the positioning structure and the pop-up mirror to clamp the pop-up mirror into the desired stationary reflective state. The combination of positioning-to-mirror overlap and electrostatic voltage must provide sufficient electrostatic force to resist the loading of the tether devices.

In an alternative embodiment, the first and second substrates may be held at ground, with each mirror in the array held at a fixed potential at the down, non-reflective state and the upright, reflective state To cause the mirror to move from the down position to the upright position, the clamping voltage would be dropped momentarily to allow for the magnetic field to actuate the pop-up mirror. To cause the mirror to move from the upright position to the down position, the clamping voltage would again be dropped momentarily and the force from the tether device would impart the necessary downward movement of the pop-up mirror (i.e. the magnetic field would not be required).

In the FIG. 7B illustration an array of pole pieces is shown in the second substrate. An array of pole pieces 42 will typically correspond to the array formation of the pop-up mirrors 14 and/or positioning structures 22. The pole pieces are used so as to provide heightened magnetic torque to the pop-up mirror. Effectively, the addition of an array of pole piece serves to increase the magnetic field as the pop-up mirrors approach the fully upright position. By increasing the magnetic field the tabs 25 of the pop-up mirror will contact an edge of a facing of the positioning structure 22 and serve to hold the pop-up mirror in a relatively stationary reflective state. The pole pieces may comprises plugs of magnetic material inserted into recesses in the second microelectronic substrate (as shown in FIG. 7B) or the array of pole pieces may comprise any other magnetic material structure capable of increasing the magnetic field as the pop-up mirror approaches an upright position.

As shown in FIGS. 7A and 7B. the trapezoidal cross-sectional shape of the positioning structures allow for the structures to act as stop-gates, while not impeding the paths of the reflected and/or non-reflected optical signals. Other positioning structure cross sectional shapes may also be used so long as they allow for the positioning structures to serve as stop-gates for the pop-up mirrors and they do not impede the paths of the reflected and/or non-reflected optical signals.

Figure 8A:
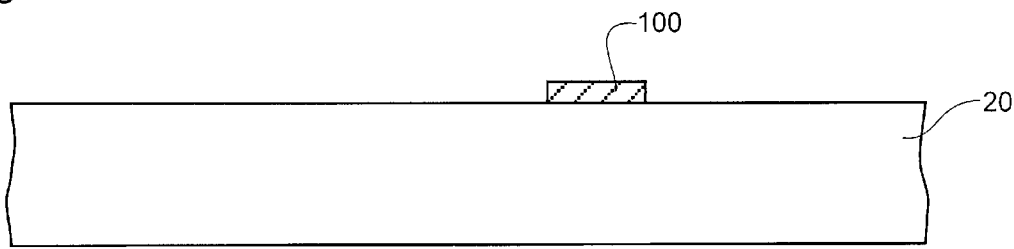
FIGS. 8A–8I are cross-sectional views of various stages in the fabrication of the second microelectronic substrate having positioning structures formed thereon in accordance with a method of making the optical cross-connect switch of the present invention.

FIGS. 8A–8I and 9A–9G illustrate cross-sectional views of various fabrication stages in accordance with a method of making the cross-connect switch in accordance with another embodiment of the present invention. FIG. 8A–8I are cross-sectional views of the second microelectronic substrate used to form the positioning structures of the present invention. Referring to FIG. 8A shown is the second microelectronic substrate 20 having patterned oxide structures 100 formed on the planar surface of the substrate. The second substrate may comprise single crystal <110> silicon or any other substrate material capable of defining the precision facing requirements for the positioning structures. The typical substrate thickness is about 700 microns. The oxide structures, typically silicon oxide (SiO$_2$) having a thickness of about 2 microns, are patterned to define the architecture of the positioning structures and serve as a mask for later reactive ion etching.

Figure 8B:
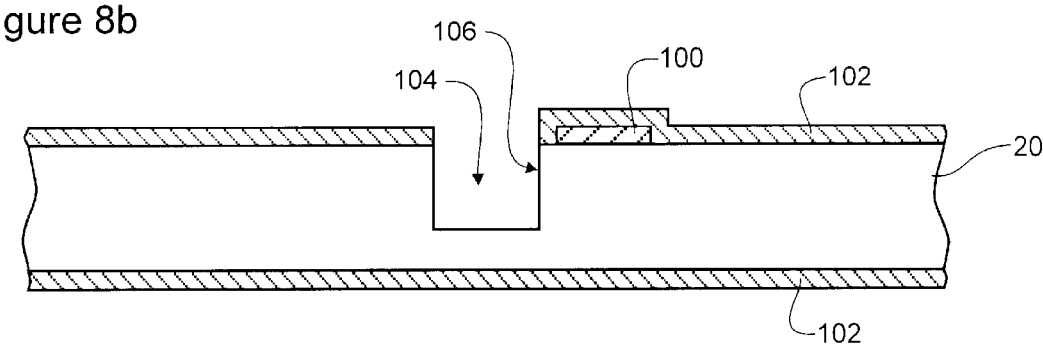

FIG. 8B depicts the second substrate after a nitride layer 102 has been deposited and an anisotropic etch process has been performed to create a precision slot 104 in the second substrate. The nitride layer, typically silicon nitride (SiN$_2$) having a thickness of about 0.3 microns, is disposed using conventional plasma enhanced chemical vapor deposition (PECVD) techniques. The nitride layer serves as an etch mask for the subsequent anisotropic etch process and allows for the later selective oxidation of the substrate. An anisotropic etch process, typically employing the use of potassium hydroxide (KOH) as the etchant, is used to form the slot in the second substrate. The slot in the second substrate will typically have a depth of about 400 microns. Anisotropic etching is preferred at this stage because it allows for sharp boundaries to define a precision face 106 formed in the second substrate. The precision face forms the side of the positioning structure that contacts the pop-up mirror in the reflective state.

Figure 8C:
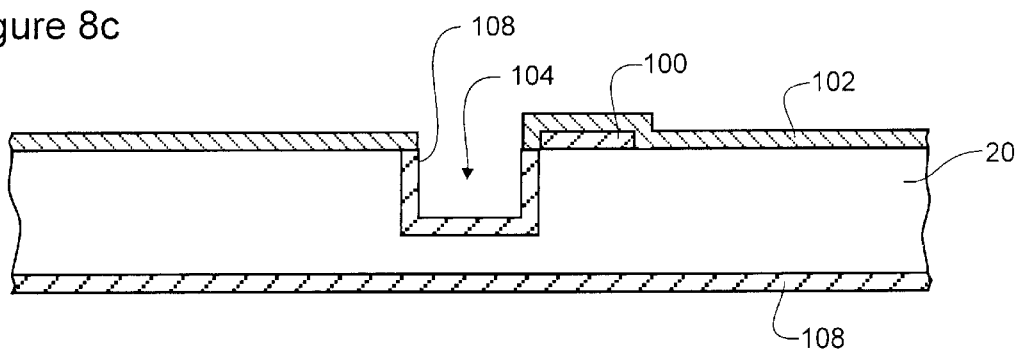

Referring now to FIG. 8C shown is the second substrate after the nitride layer has been removed from the backside of the substrate and the substrate has been oxidized in all exposed areas. A conventional stripping process is used to remove the nitride layer from the backside of the substrate. An oxide layer 108 is typically disposed by subjecting the substrate to an oxygen atmosphere at high temperature. The oxide layer in the precision slot is formed to preserve the positioning facing during subsequent reactive ion etch processing. A typically oxide layer may be about 2 microns in thickness.

Figure 8D:
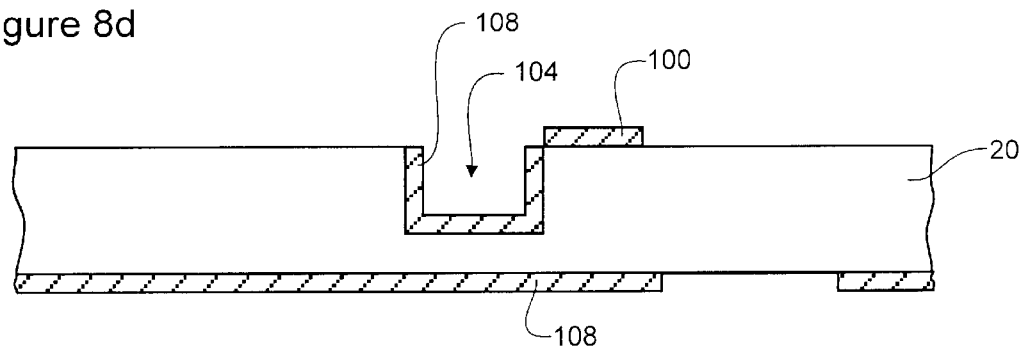
Figure 8E:
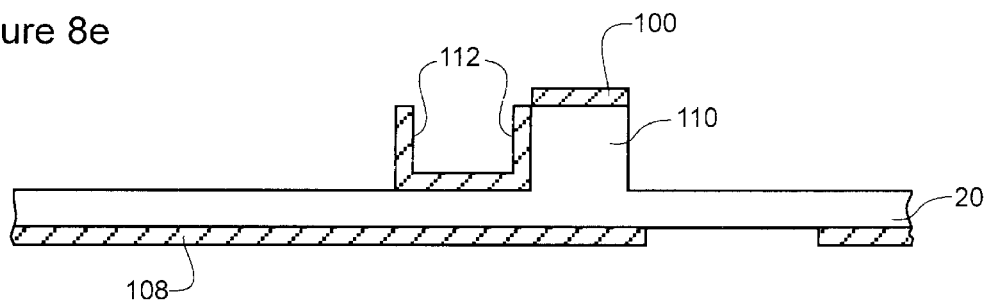

FIG. 8D illustrates the second substrate after the backside oxide layer 108 has been patterned to mask for a subsequent second reactive ion etch process and the frontside nitride layer has been removed. The backside oxide layer patterning is employed in those embodiments of the cross-connect switch that utilize a pole piece in the second substrate. In embodiments in which a pole piece is not used, the backside oxide layer patterning may be avoided. A conventional stripping process is typically used to remove the nitride layer from the frontside of the substrate. Following removal of the frontside nitride layer, the frontside of the substrate is subjected to a first deep reactive ion etch (RIE) process. The use of deep RIE processing is well known by those of ordinary skill in the art. As shown in FIG. 8E the resulting frontside of the substrate has been etched back in all areas that were not protected by an oxide layer. The first deep reactive ion etch process results in a silicon positioning structure 110 and a remaining oxide fence 112 that continues to serve as protection for the facing of the positioning structure.

Figure 8F:
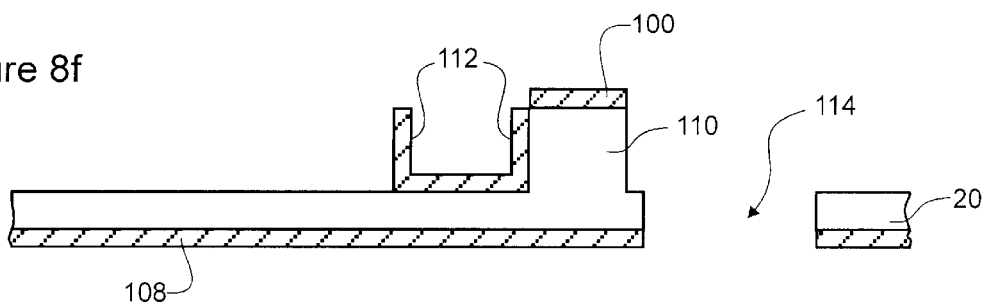

As shown in FIG. 8F a second deep reactive ion etch process is used on the backside of the second substrate to expose an opening 114 through the substrate. The deep reactive ion etch process will allow etching to occur on all surfaces not protected by an oxide layer. The opening in backside of the second substrate allows for a magnetic pole piece (not shown in FIG. 8) to be positioned therein. The use of magnetic pole pieces for increasing magnetic pull near the positioning structures has been previously discussed in detail. In those embodiments that do not utilize a magnetic pole piece the second RIE process may be avoided.

Figure 8G:
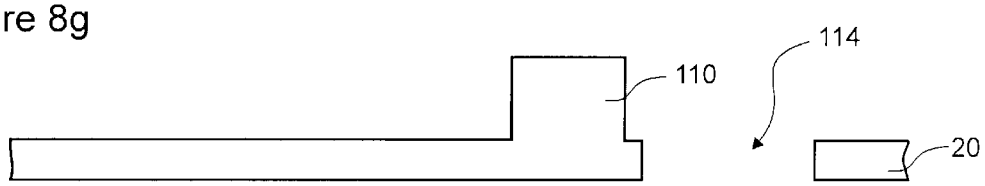
Figure 8H:
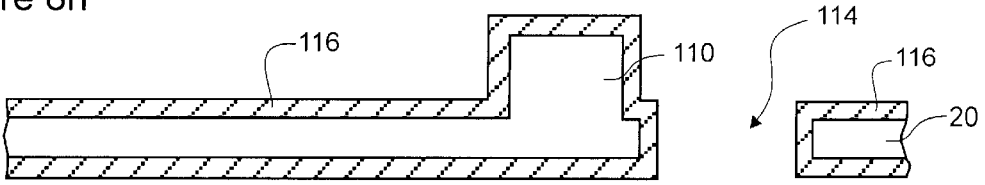
Figure 8I:
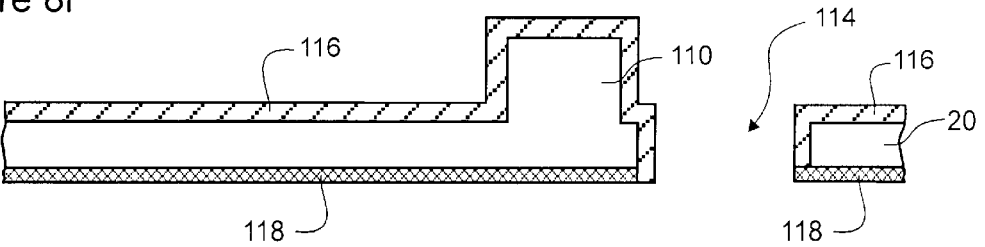

Referring to FIG. 8G the remaining oxide layering and oxide fence have been removed by subjecting the entire substrate to a wet etch process. A typical wet etch process will involve exposing the substrate to a fluoride bath for a predetermined time period. Once the oxide fence is removed, the entire wafer is subjected to a re-oxidizing process, as shown in FIG. 8H. The re-oxidize process results in an oxide layer 116, typically about 2 microns in thickness, being formed over all exposed silicon surfaces. As illustrated in FIG. 8I, the final processing steps involve removing the backside oxide and forming a metallic layer 118 along the backside of the substrate. The backside oxide may be removed by a conventional dry reactive ion etch procedure. The metallic layer, typically gold, is disposed by using a standard evaporation technique. The metallic layer serves as wirebonding for providing electrostatic voltage to the positioning structures.

Figure 9A:
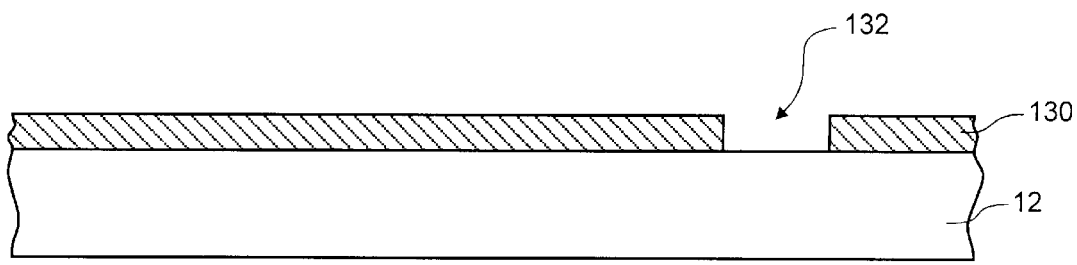
FIGS. 9A–9E are cross-sectional views of various stages in the fabrication of the first microelectronic substrate having pop-up mirrors formed thereon in accordance with a method of making the optical cross-connect switch of the present invention.

FIGS. 9A–9D illustrate cross-sectional views of various processing steps in the fabrication of the first microelectronic substrate 12. The first microelectronic substrate is used to form the pop-up mirrors and the tethering device in accordance with an embodiment of the present invention. The first substrate may comprise silicon, although other suitable semiconductor materials, such as quartz or glass, may also be used as materials comprising the first substrate. FIG. 9A illustrates the first substrate 12 after a dielectric layer 130 has been disposed on the substrate and the dielectric layer has been patterned and etched to provide for a substrate via 132. The dielectric layer, which may comprise silicon nitride, is typically disposed by convention low-pressure chemical vapor deposition (LPCVD) techniques with a typical thickness of about 0.5 microns. The base dielectric layer allows for the pop-up mirror to be electrically isolated from the first substrate. The substrate via is formed in the dielectric layer to provide a connection to the substrate for a subsequently formed electrical contact. The electrical contact provides the clamping voltage necessary for holding the pop-up mirrors in a "down" or non-reflective state.

Figure 9B:
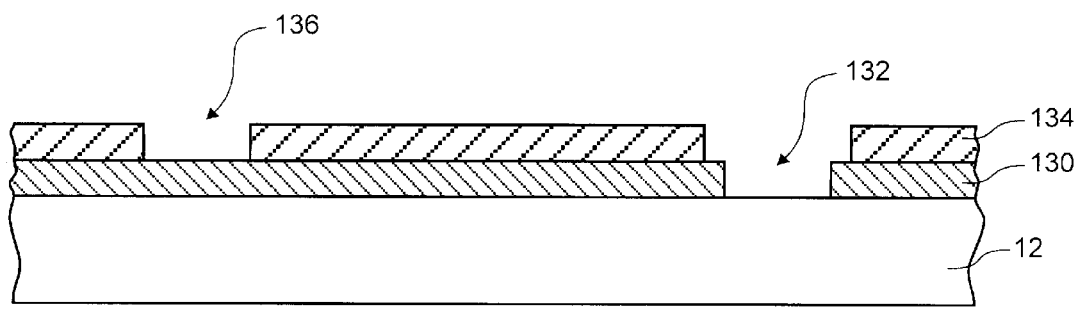

Referring now to FIG. 9B, shown is the first substrate after a sacrificial release layer 134 has been disposed on the substrate and the release layer has been patterned and etched to provide for the substrate via 132 and an anchor via 136. The release layer, which may comprise a low temperature oxide, is typically disposed by conventional LPCVD techniques with a typical thickness of about 1 micron. The release layer, which is subsequently etched away, is formed so that the pop-up mirror and related tether device can be released from the surface of the first substrate. The anchor via is formed in the release layer to provide a connection to the dielectric layer for a subsequently formed anchor that connects the pop-up mirror and tether device to the substrate.

Figure 9C:
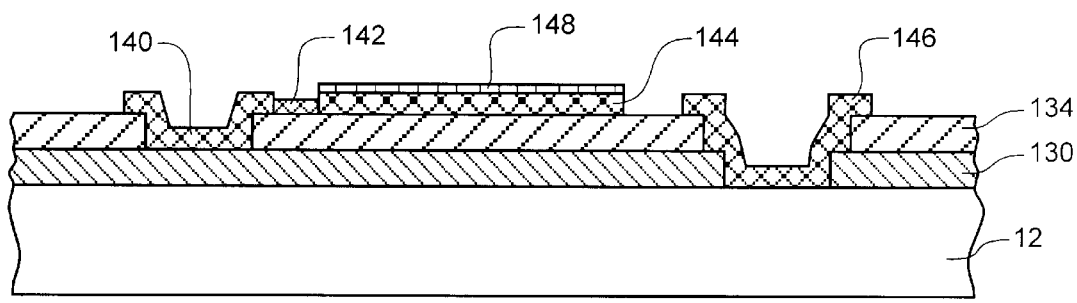

As shown in FIG. 9C, after formation and patterning of the release layer a component layer is disposed on the first substrate and the component layer is patterned and etched to define the anchor 140, the tether device 142, the pop-up mirror plate and tabs 144 and the electrical contact 146. The component layer, which is typically formed of a robust, flexible material, such as poly-silicon, is disposed by conventional LPCD techniques with a typical thickness of about 2 microns. The anchor and tether device are electrically isolated from the first substrate by dielectric layer 130. A reflective layer 148 is formed on the pop-up mirror plate and serves as the mirror surface. The reflective layer, which may comprise a metallic material, such as gold, is typically disposed by a conventional evaporation technique with a thickness of about 0.1 to about 1.0 microns.

Figure 9D:
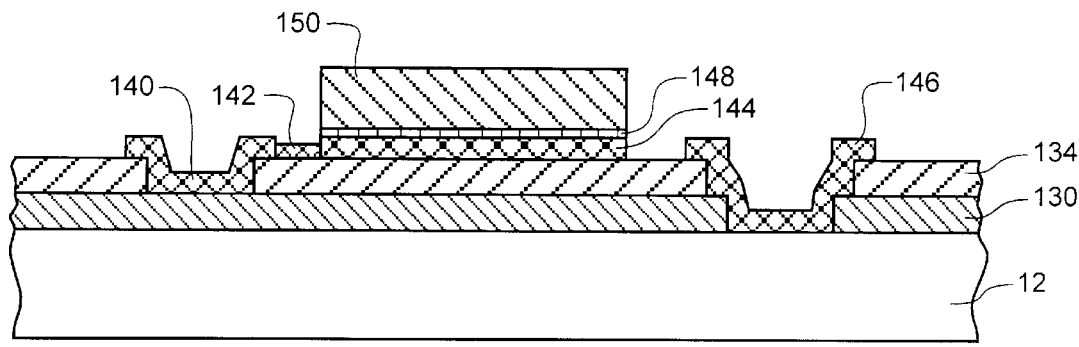

FIG. 9D depicts the first substrate after a frame layer 150 has been disposed on the pop-up mirror construct. The frame layer, which is typically formed of a magnetically active material, such as nickel, is disposed about the periphery of the reflective layer 148 so as to serve as a frame for the mirrored surface of the pop-up mirror construct. The frame layer may be disposed by standard electroplating techniques and may have a thickness of about 10 microns to about 50 microns, typically about 30 microns. The thickness of the frame layer provides stiffness to the overall pop-up mirror construct. The magnetically active characteristic of the frame layer is desired in those embodiments that utilize a magnetic field to actuate the pop-up mirror from a non-reflective to reflective state.

Figure 9E:
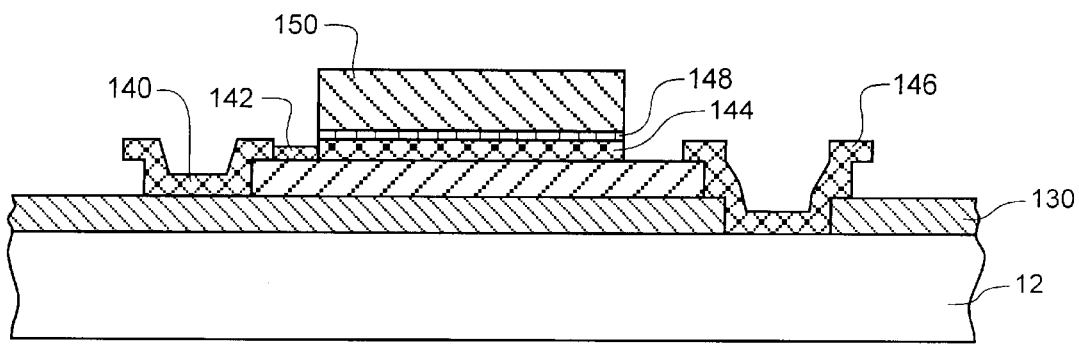

Referring to FIG. 9E, the sacrificial release layer 134 (not shown in FIG. 9E) has been removed thereby releasing the pop-up mirror and the tether device from the surface of the substrate. The release layer is removed by conventional dry etch processing. The electrical contact 146 is a global electrical connection to the substrate and as such serves all pop-up mirrors in an array embodiment. The anchor device 140 is electrically connected to the electrical contact via wire bonding on the backside of the substrate (not shown in FIG. 9E).

The first and second substrates are disposed in a fixed positional relationship so that the positioning structures of the second substrate act as stop-gates and provide for a locking mechanism for the pop-up mirrors of the first substrate. Positioning of the first and second substrates may be achieved by the support structures 24 shown in FIGS. 1 and 7. The support structures 24 may be formed on the surface of the first substrate and are typically located about the periphery of the substrate. The support structures may be fabricated in unison with the pop-up mirrors and, as such, comprise a layering of materials used to fabricate the pop-up mirrors. The support structures of the first substrate may be connected to the second substrate by conventional bonding techniques. Alternately, the support structures may be separately fabricated bonding pads that are bonded to the surfaces of the first substrate and the second substrate after fabrication of the respective pop-up mirrors and positioning structures. A metallic material, such as gold, may be used to form the support structures.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A MEMS optical cross-connect switch comprising:
 a first microelectronic substrate having a first surface;
 a pop-up mirror disposed on the first surface;
 a rotational magnetic field source disposed proximate the first microelectronic substrate that actuates the pop-up mirror; and
 a second microelectronic substrate disposed in a fixed positional relationship relative to said first microelectronic substrate, said second microelectronic substrate having at least one positioning structure for positioning said pop-up mirror in a reflective state.

2. The MEMS optical cross-connect switch of claim 1, wherein said rotational magnetic field source further comprises a plurality of magnetic field sources.

3. The MEMS optical cross-connect switch of claim 2, wherein said plurality of magnetic field sources further comprises a first and a second magnetic field source.

4. The MEMS optical cross-connect switch of claim 3, wherein the first magnetic field source generates a first magnetic field component disposed at a predetermined angle relative to a second magnetic field component generated by the second magnetic field source.

5. The MEMS optical-cross connect switch of claim 3, wherein the first magnetic field source generates a first magnetic field component generally orthogonal to the second magnetic field component generated by the second magnetic field source.

6. The MEMS optical cross-connect switch of claim 3, wherein the first magnetic field source generates a first magnetic field component generally perpendicular to the first surface of said first microelectronic substrate and the second magnetic field source generates a second magnetic field component generally parallel to the first surface of the first microelectronic substrate.

7. The MEMS optical cross-connect switch of claim 2, wherein the plurality of magnetic field sources further comprise conductive coils.

8. The MEMS optical cross-connect switch of claim 2, wherein said plurality of magnetic field sources further comprises variably controlled magnetic field sources.

9. The MEMS optical cross-connect switch of claim 2, wherein said plurality of magnetic field sources generate a composite magnetic field axis urging movement of said pop-up mirror.

10. MEMS optical cross-connect switch of claim 2, wherein said plurality of magnetic field sources generate an initial composite magnetic field axis that is about 45 degrees askew to the first surface of the first microelectronic substrate.

11. The MEMS optical cross-connect switch of claim 1, wherein said at least one positioning structure further comprises at least one positioning structure extending from said second microelectronic substrate toward the first surface of said first microelectronic substrate.

12. The MEMS optical cross-connect switch of claim 11, wherein said pop-up mirror is positioned in a reflective state by contacting at least one tab structure of said pop-up mirror with the at least one positioning structure.

13. The MEMS optical cross-connect switch of claim 11, wherein said pop-up mirror is positioned in a reflective state by contacting a top tab of said pop-up mirror with at least one positioning structure.

14. The MEMS optical cross-connect switch of claim 11, wherein said at least one positioning structure has a cross-sectional shape that allows for unobstructed passage of optical signals.

15. The MEMS optical cross-connect switch of claim 11, wherein said at least one positioning structure has a generally trapezoidal cross-sectional shape.

16. The MEMS optical cross-connect switch of claim 1, further comprising a tether device selectively operable for attracting said pop-up mirror to said first microelectronic substrate.

17. The MEMS optical cross-connect switch of claim 16, wherein said tether device further comprises an anchor portion attached to the first microelectronic substrate and a hairpin portion attached to the anchor and released from the first microelectronic substrate.

18. The MEMS optical cross-connect switch of claim 16, wherein said tether device is capable of electrostatic activation to retain said pop-up mirror in a predetermined position with respect to the first surface of the first microelectronic substrate.

19. The MEMS optical cross-connect switch of claim 1, wherein said at least one positioning structure further comprises a recess in the second microelectronic substrate that allows for said pop-up mirror to be positioned in a reflective state by having a tab structure of said pop-up mirror contact an interior surface of the recess.

20. The MEMS optical cross-connect switch of claim 1, wherein said at least one positioning structure is capable of being electrostatically activated to provide a voltage to clamp said pop-up mirror in a reflective state.

21. The MEMS optical cross-connect switch of claim 1, wherein said rotational magnetic field source provides for a magnetic field oriented with respect to said first microelectronic substrate to interact with said pop-up mirror.

22. The MEMS optical cross-connect switch of claim 4 wherein said rotational magnetic field source actuates the pop-up mirror from a non-reflective state to the reflective state.

23. The MEMS optical cross-connect switch of claim 1, wherein said second microelectronic substrate comprises a material having precision surface facing capabilities.

24. The MEMS optical cross-connect switch of claim 1, wherein said second microelectronic substrate comprises <110> crystal silicon.

25. A MEMS optical cross-connect switch comprising:
a first microelectronic substrate having a first surface;
a pop-up mirror disposed on the first surface; and
a rotational magnetic field source disposed proximate the first microelectronic substrate that actuates the pop-up mirror,
wherein said pop-up mirror further comprises at least one or more materials capable of optical reflectivity and magnetic activity.

26. A MEMS optical cross-connect switch comprising:
a first microelectronic substrate having a first surface;
a pop-up mirror disposed on the first surface; and
a rotational magnetic field source disposed proximate the first microelectronic substrate that actuates the pop-up mirror,
wherein said pop-up mirror further comprises an outlying frame portion attached about the periphery of said pop-up mirror.

27. A MEMS optical cross-connect switch comprising:
a first microelectronic substrate having a first surface;
a pop-up mirror disposed on the first surface and that rotates from a non-reflective state to a reflective state; and
a positioning structure disposed in a fixed positional relationship relative to the first microelectronic substrate, wherein said positioning structure engages said pop-up mirror upon rotation of said pop-up mirror to the reflective state,
wherein said positioning structure further comprises a positioning structure extending from a second microelectronic substrate, wherein the second microelectronic substrate is disposed in a fixed positional relationship relative to the first microelectronic substrate.

28. The MEMS optical cross-connect switch of claim 27, further comprising a plurality of magnetic field sources.

29. The MEMS optical cross-connect switch of claim 28, wherein said plurality of magnetic field sources further comprises variably controlled magnetic field sources capable of generating a rotational magnetic field.

30. The MEMS optical cross-connect switch of claim 28, wherein said plurality of magnetic field sources generates a composite magnetic field axis urging movement of said pop-up mirror.

31. The MEMS optical cross-connect switch of claim 28, wherein said plurality of magnetic field sources generates an initial composite magnetic field axis that is about 45 degrees askew to the first surface of the first microelectronic substrate.

32. The MEMS optical cross-connect switch of claim 28, wherein the plurality of magnetic field sources further comprise conductive coils.

33. The MEMS optical cross-connect switch of claim 27, further comprising a tether device selectively operable for attracting said pop-up mirror to said first microelectronic substrate.

34. The MEMS optical cross-connect switch of claim 33, wherein said tether device is electrostatically activated to retain the pop-up mirror in a predetermined position with respect to the first surface of the first microelectronic substrate.

35. The MEMS optical cross-connect switch of claim 33, wherein said tether device further comprises an anchor portion attached to the first microelectronic substrate and a hairpin portion attached to the anchor and released from the underlying first microelectronic substrate.

36. The MEMS optical cross-connect switch of claim 27, wherein said positioning structure extends toward said first microelectronic substrate and is electrically isolated from said first microelectronic substrate by an air gap.

37. The MEMS optical cross-connect switch of claim 27, further comprising a magnetic field source that provides for a magnetic field oriented with respect to the said first microelectronic substrate to interact with said pop-up mirror.

38. The MEMS optical cross-connect switch of claim 27, wherein said positioning structure has a cross-sectional shape that allows for unobstructed passage of optical signals.

39. The MEMS optical cross-connect switch of claim 27, wherein said positioning structure has a generally trapezoidal cross-sectional shape.

40. The MEMS optical cross-connect switch of claim 27, wherein the positioning structure is electrostatically activated to provide voltage to clamp said pop-up mirror in a reflective state.

41. The MEMS optical cross-connect switch of claim 27, further comprising a second positioning structure that positions said pop-up mirror when said pop-up mirror has been actuated.

42. The MEMS optical cross-connect switch of claim 27, wherein the second positioning structure is electrostatically activated to provide voltage to clamp said pop-up mirror in a reflective state.

43. The MEMS optical cross-connect switch of claim 27, further comprising a magnetic pole piece disposed proximate to said second microelectronic substrate to further the magnetic actuation of said pop-up mirror.

44. A MEMS optical cross-connect switch comprising:
   a first microelectronic substrate having a first surface;
   a pop-up mirror disposed on the first surface and that rotates from a non-reflective state to a reflective state;
   a positioning structure disposed in a fixed positional relationship relative to the first microelectronic substrate, wherein said positioning structure engages said pop-up mirror upon rotation of said pop-up mirror to the reflective state; and
   a plurality of magnetic field sources wherein said plurality of magnetic field sources further comprises a first and a second magnetic field source.

45. The MEMS optical cross-connect switch of claim 44, wherein the first magnetic field source generates a first magnetic field component disposed at a predetermined angle relative to a second magnetic field component generated by the second magnetic field source.

46. The MEMS optical-cross connect switch of claim 44, wherein the first magnetic field source generates a first magnetic field component generally orthogonal to the second magnetic field component generated by the second magnetic field source.

47. The MEMS optical cross-connect switch of claim 44, wherein the first magnetic field source generates a first magnetic field component generally perpendicular to the first surface of said first microelectronic substrate and the second magnetic field source generates a second magnetic field component generally parallel to the first surface of the first microelectronic substrate.

48. A MEMS optical cross-connect switch comprising:
   a first microelectronic substrate having a first surface;
   a pop-up mirror disposed on the first surface and that rotates from a non-reflective state to a reflective state; and
   a positioning structure disposed in a fixed positional relationship relative to the first microelectronic substrate, wherein said positioning structure engages said pop-up mirror upon rotation of said pop-up mirror to the reflective state,
   wherein said pop-up mirror further comprises at least one or more materials capable of optical reflectivity and magnetic activity.

49. A MEMS optical cross-connect switch comprising:
   a first microelectronic substrate having a first surface;
   a pop-up mirror disposed on the first surface and that rotates from a non-reflective state to a reflective state; and
   a positioning structure disposed in a fixed positional relationship relative to the first microelectronic substrate, wherein said positioning structure engages said pop-up mirror upon rotation of said pop-up mirror to the reflective state,
   wherein said pop-up mirror further comprises a frame portion attached along the periphery of said pop-up mirror.

50. The MEMS optical cross-connect switch of claim 49, wherein said frame portion is magnetically active.

51. A MEMS optical cross-connect switch comprising:
   a first microelectronic substrate having, a first surface,
   a magnetically active pop-up mirror disposed on the first surface wherein said pop-up mirror remains in a position generally parallel to the first surface of said first microelectronic substrate when electrostatic voltage is applied to said pop-up mirror,
   a second microelectronic substrate disposed in a fixed positional relationship relative to said first microelectronic substrate, said second microelectronic substrate having at least two positioning structures extending from said second microelectronic substrate toward the first surface of said first microelectronic substrate, wherein said at least two positioning structures serve to restrict further movement of said pop-up mirror and electrostatically clamp said pop-up mirror in a stationary position when the pop-up mirror has been activated to allow for optical signal reflection, and
   a magnetic field source disposed about said first and second microelectronic substrate such that a magnetic field may be activated to propel said pop-up mirror into a position that allows for the pop-up mirror to be electrostatically clamped to the at least two positioning structures.

52. The MEMS optical cross-connect switch of claim 51, wherein said magnetic field source further comprises a rotational magnetic field source.

53. The MEMS optical cross-connect switch of claim 51, further comprising a magnetic pole piece disposed proximate to said second microelectronic substrate, wherein the magnetic pole piece provides additional magnetic force to the pop-up mirror.

54. A MEMS optical cross-connect switch array comprising:
- a first microelectronic substrate having a first surface;
- at least two pop-up mirrors disposed on the first surface of the first microelectronic substrate;
- a rotational magnetic field source disposed proximate the first microelectronic substrate; and
- a second microelectronic substrate disposed in a fixed positional relationship relative to said first microelectronic substrate, said second microelectronic substrate having at least two positioning structures for positioning said pop-up mirror in a reflective state.

55. The MEMS optical cross-connect switch array of claim 54, wherein the at least two pop-up mirrors further comprise $n^2$ pop-up mirrors aligned in n columns and n rows.

56. The MEMS optical cross-connect switch array of claim 54, wherein the at least two pop-up mirrors further comprise n×m pop-up mirrors aligned in n columns and m rows.

57. The MEMS optical cross-connect switch array of claim 54, further comprising at least two positioning structures disposed on the surface of said first microelectronic substrate for positioning said at least two pop-up mirrors in reflective states.

58. The MEMS optical cross-connect switch array of claim 54, further comprising at least two magnetic pole pieces disposed proximate to said second microelectronic substrate, wherein the at least two magnetic pole pieces provide magnetic attraction for the at least two pop-up mirrors.

59. A MEMS optical cross-connect switch array comprising
- a first microelectronic substrate having a first surface;
- at least two pop-up mirrors disposed on the first surface of the first microelectronic substrate; and
- a second microelectronic substrate disposed in a fixed positional relationship relative to said first microelectronic substrate, said second microelectronic substrate having at least two positioning structures extending from said second microelectronic substrate toward the first surface of said first microelectronic substrate, wherein said at least two positioning structures serve to restrict further movement of said at least two pop-up mirrors when the pop-up mirrors have been activated to allow for optical signal reflection.

60. The MEMS optical cross-connect switch array of claim 59, further comprising a plurality of magnetic field sources.

61. The MEMS optical cross-connect switch array of claim 60, wherein said plurality of magnetic field sources further comprises variably controlled magnetic field sources capable of generating a rotational magnetic field.

62. The MEMS optical cross-connect switch array of claim 60, wherein said plurality of magnetic field sources generates a composite magnetic field axis, urging movement of said at least two pop-up mirrors.

63. The MEMS optical cross-connect switch array of claim 60, further comprising at least two magnetic pole pieces disposed proximate the second microelectronic substrate, wherein the at least two magnetic pole pieces provide further magnetic attraction for the at least two pop-up mirrors.

64. The MEMS optical cross-connect switch array of claim 59, further comprising a magnetic field source that provides for a magnetic field oriented with respect to the said first microelectronic substrate to interact with said at least two pop-up mirrors.

65. The MEMS optical cross-connect switch array of claim 64, further comprising at least two magnetic pole pieces disposed proximate the second microelectronic substrate, wherein the at least two magnetic pole pieces provide magnetic attraction for the at least two pop-up mirrors.

66. The MEMS optical cross-connect switch array of claim 59, wherein the at least two pop-up mirrors further comprise $n^2$ pop-up mirrors aligned in n columns and rows.

67. The MEMS optical cross-connect switch array of claim 59, wherein the at least two pop-up mirrors further comprise n×m pop-up mirrors aligned in n columns and m rows.

68. The MEMS optical cross-connect switch array of claim 59, wherein the at least two pop-up mirrors further comprise $n^2$ pop-up mirrors aligned in n columns and n rows, and the at least two positioning structures further comprise $(n^2+n+(n-1))$ positioning structures aligned in n+1 columns and n+1 rows, wherein n is a whole number greater than one.

69. The MEMS optical cross-connect switch array of claim 59, wherein said at least two positioning structures are electrically isolated from said first microelectronic substrate by an air gap.

70. The MEMS optical cross-connect switch array of claim 59, wherein said at least two positioning structures have a cross-sectional shape that allows for unobstructed passage of optical signals.

71. The MEMS optical cross-connect switch array of claim 59, wherein said at least two positioning structures have a generally trapezoidal cross-sectional shape.

72. The MEMS optical cross-connect switch array of claim 59, wherein said at least two positioning structures are electrostatically activated to provide voltage to clamp said pop-up mirror in a reflective state.

73. A MEMS optical cross-connect switch array comprising:
- a first microelectronic substrate having a first surface,
- at least two pop-up mirrors disposed on the first surface of the first microelectronic substrate;
- a second microelectronic substrate disposed in a fixed positional relationship relative to said first microelectronic substrate,
- a magnetic field source that provides for a magnetic field oriented with respect to the said first microelectronic substrate to interact with said at least two pop-up mirrors; and
- at least two magnetic pole pieces disposed proximate to said second microelectronic substrate, wherein the at least two magnetic pole pieces provide for further magnetic attraction of the pop-up mirror.

74. The MEMS optical cross-connect switch array of claim 73, wherein said second microelectronic substrate provides for at least two positioning structures extending from said second microelectronic substrate toward the first surface of said first microelectronic substrate, wherein said at least two positioning structures serve to restrict further movement of said at least two pop-up mirrors when the pop-up mirrors have been activated to allow for optical signal reflection.

75. A MEMS optical cross-connect switching system comprising:
   a first microelectronic substrate having a first surface;
   at least one optical fiber input disposed about the perimeter of the first microelectronic substrate;
   at least two optical fiber outputs disposed about the perimeter of the first microelectronic chip;
   at least one pop-up mirror disposed on the first surface;
   a rotational magnetic field source disposed proximate the first microelectronic substrate, wherein the rotational magnetic field source actuates the at least one pop-up mirror from a non-reflective to non-reflective state; and
   a second microelectronic substrate disposed in a fixed positional relationship relative to said first microelectronic substrate, said second microelectronic substrate having at least one positioning structure extending from said second microelectronic substrate toward the first surface of said first microelectronic substrate, wherein said at least one positioning structure serves to restrict further movement of said at least one pop-up mirror when the at least one pop-up mirror has been activated to allow for optical signal reflection.

76. The MEMS optical cross-connect switching system of claim 75, wherein said at least one positioning structure is electrostatically activated to provide voltage to clamp said at least one pop-up mirror in a reflective state.

77. The MEMS optical cross-connect switching system of claim 75, further comprising at least one magnetic pole piece disposed proximate the second microelectronic substrate, wherein the at least one magnetic pole piece provides further magnetic attraction to the at least one pop-up mirror.

78. The MEMS optical cross-connect switching system of claim 75, wherein at least one optical fiber output is disposed about the perimeter generally orthogonal to the at least one optical fiber input and at least one optical fiber output is disposed about the perimeter generally 180 degrees opposite the at least one optical fiber input.

79. The MEMS optical cross-connect switching system of claim 75, wherein the at least one pop-up mirror is oriented at a generally 45 degree angle in respect to the at least one optical fiber input.

80. A MEMS optical cross-connect switching system comprising:
   a first microelectronic substrate having a first surface
   at least one optical fiber input disposed about the perimeter of the first microelectronic chip;
   at least two optical fiber outputs disposed about the perimeter of the first microelectronic chip;
   at least one pop-up mirror disposed on the first surface, and
   a second microelectronic substrate disposed in a fixed positional relationship relative to said first microelectronic substrate, said second microelectronic substrate having at least one positioning structure extending from said second microelectronic substrate toward the first surface of said first microelectronic substrate, wherein said at least one positioning structure serves to restrict further movement of said at least one pop-up mirror when the at least one pop-up mirror has been activated to allow for optical signal reflection.

81. The MEMS optical cross-connect switching system of claim 80, further comprising a magnetic field source that provides for a magnetic field oriented with respect to the said first microelectronic substrate and said second microelectronic substrate to interact with said at least one pop-up mirror.

82. The MEMS optical cross-connect switching system of claim 81, wherein said magnetic field source further comprises a variably controlled magnetic field source capable of generating a rotational magnetic field.

83. The MEMS optical-cross-connect switching system of claim 82, further comprising at least one magnetic pole piece disposed proximate the second microelectronic substrate, wherein the at least one magnetic pole piece provides further magnetic attraction to the at least one pop-up mirror.

84. The MEMS optical cross-connect switching system of claim 80, wherein said at least one positioning structure is electrostatically activated to provide voltage to clamp said at least one pop-up mirror in a reflective state.

85. A MEMS optical switch comprising:
   a microelectronic substrate;
   a pop-up mirror disposed on a surface of the microelectronic substrate and configured to rotate between first and second angular positions with respect to the surface of the substrate;
   a rotational magnetic field source disposed proximate the microelectronic substrate that rotates the pop-up mirror between the first and second angular positions; and
   a positioning structure having a surface that contacts the pop-up mirror as the pop-up mirror is rotated to the second position.

86. The MEMS optical switch of claim 85, wherein the microelectronic substrate comprises a first microelectronic substrate, wherein the MEMS optical switch further comprises a second microelectronic substrate disposed substantially parallel to the first microelectronic substrate, and wherein the positioning structure comprises a member that extends from the second microelectronic substrate towards the first microelectronic substrate.

87. The MEMS optical switch of claim 86, wherein the member does not contact the surface of the first microelectronic substrate.

88. The MEMS optical switch of claim 86, further comprising an insulating layer in contact with the member and the first microelectronic substrate.

89. The MEMS optical switch of claim 85, wherein the first position comprises a first angular displacement with respect to the surface of the microelectronic substrate, wherein the second position comprises a second angular displacement with respect to the microelectronic substrate that is greater than the first angular displacement, and wherein the rotational magnetic field source is operative to apply a magnetic force to the pop-up mirror that increases as the pop-up mirror rotates from the first position towards the second position.

90. The MEMS optical switch of claim 89, wherein the rotational magnetic field source comprises a first magnet that generates a first rotational force on the pop-up mirror and a second magnet that produces an additive second rotational force on the pop-up mirror as the pop-up mirror rotates toward the second position.

91. The MEMS optical switch of claim 85, wherein the first position comprises a first angular displacement with respect to the surface of the microelectronic substrate, wherein the second position comprises a second angular displacement with respect to the microelectronic substrate that is greater than the first angular displacement, and wherein the rotational magnetic field source comprises an electromagnet assembly that produces a rotating magnetic field.

92. The MEMS optical switch of claim 85, further comprising means for electrostatically retaining the pop-up mirror in at least one of the first position and the second position.

93. The MEMS optical switch of claim 85, wherein the pop-up mirror is configured to rotate between the first and second angular positions about an axis parallel to the surface of the substrate.

94. A method for cross-connect switching of optical signals in a microelectronic device, the method comprising the steps of:

receiving an input signal on an optical path;

generating a rotational magnetic field to actuate a pop-up mirror from a non-reflective state to a reflective state;

reflecting the input signal off the pop-up mirror on another optical path;

maintaining position of the pop-up mirror at the reflective state; and restricting the actuation of the pop-up mirror with at least one positioning structure extending from a second microelectronic substrate toward the first microelectronic substrate.

95. The method of claim 94, wherein the optical path is generally parallel to a surface of a first microelectronic substrate having the pop-up mirror disposed on the surface.

96. The method of claim 94, further comprising the step of clamping electrostatically the actuated pop-up mirror in a reflective state by applying voltage to at least one positioning structure.

97. A method for making an optical cross connect switch, the method comprising the steps of:

disposing at least one pop-up mirror on the surface of a first microelectronic substrate, defining at least one positioning structure within a second microelectronic substrate; and positioning the first microelectronic substrate in a fixed relationship with the second microelectronic substrate such that the at least one positioning structure of the second microelectronic substrate serves to impede further actuation of the at least one pop-up mirror beyond the reflective state.

98. The method of claim 97, further comprising the step of providing for electrostatic voltage to be applied to the at least one positioning structure to allow the at least one pop-up mirror to be electrostatically clamped to the at least one positioning structure in the reflective state.

99. The method of claim 97, wherein the step of defining at least one positioning structure in the surface of the second microelectronic substrate, further comprises the steps of:

etching anisotropically at least one opening in the second microelectronic substrate that will define a precision facing of the at least one positioning structure, creating an oxide barrier in the at least one opening to protect the precision facing of the at least one positioning structure, performing a deep reactive ion etch to define the remaining structure of the at least one positioning structure;

removing the oxide barrier in the at least one opening, and re-oxidizing the second microelectronic substrate.

\* \* \* \* \*